United States Patent
Li et al.

(10) Patent No.: US 12,263,758 B2
(45) Date of Patent: Apr. 1, 2025

(54) VEHICLE THERMAL MANAGEMENT SYSTEM AND METHOD

(71) Applicant: Huawei Digital Power Technologies Co., Ltd., Shenzhen (CN)

(72) Inventors: Quanming Li, Dongguan (CN); Jun Chen, Dongguan (CN); Chaopeng Liu, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 732 days.

(21) Appl. No.: 17/404,236

(22) Filed: Aug. 17, 2021

(65) Prior Publication Data

US 2021/0370799 A1 Dec. 2, 2021

Related U.S. Application Data

(63) Continuation of application No. PCT/CN2020/126085, filed on Nov. 3, 2020.

(30) Foreign Application Priority Data

Feb. 18, 2020 (CN) .......................... 202010099920.9

(51) Int. Cl.
  *B60L 58/26* (2019.01)
  *H01M 10/613* (2014.01)
  (Continued)

(52) U.S. Cl.
  CPC ........... *B60L 58/26* (2019.02); *H01M 10/613* (2015.04); *H01M 10/625* (2015.04);
  (Continued)

(58) Field of Classification Search
  CPC ... B60L 58/26; H01M 10/613; H01M 10/625; H01M 10/635; H01M 10/6568; H01M 10/66; H01M 2220/20
  See application file for complete search history.

(56) References Cited

U.S. PATENT DOCUMENTS

2018/0091012 A1  3/2018 Yang et al.
2018/0111443 A1  4/2018 Kim et al.
(Continued)

FOREIGN PATENT DOCUMENTS

CN  103946042 A  7/2014
CN  204870439 U  12/2015
(Continued)

*Primary Examiner* — Brian R Ohara
*Assistant Examiner* — Patrick Marshall Greene
(74) *Attorney, Agent, or Firm* — WOMBLE BOND DICKINSON (US) LLP

(57) ABSTRACT

Embodiments of this application disclose a vehicle thermal management system and method. The system includes a refrigeration cycle system, a coolant cycle system, and a control device, where the coolant cycle system includes a coolant cycle frontend radiator, a power assembly heat dissipation system, a battery pack heat dissipation system, a primary path water pump, a bypass water pump, and a valve bank system. In the system, the refrigeration cycle system is connected to the primary path water pump. Furthermore, in the system, the power assembly heat dissipation system and the battery pack heat dissipation system share the refrigeration cycle system and the coolant cycle frontend radiator by using the primary path water pump, the bypass water pump, and a combination of the valve bank system.

9 Claims, 16 Drawing Sheets

(51) Int. Cl.
    *H01M 10/625*     (2014.01)
    *H01M 10/635*     (2014.01)
    *H01M 10/6568*     (2014.01)
    *H01M 10/66*     (2014.01)

(52) U.S. Cl.
    CPC ..... *H01M 10/635* (2015.04); *H01M 10/6568* (2015.04); *H01M 10/66* (2015.04); *H01M 2220/20* (2013.01)

(56) References Cited

U.S. PATENT DOCUMENTS

| | | |
|---|---|---|
| 2019/0070924 A1 | 3/2019 | Mancini et al. |
| 2021/0252942 A1* | 8/2021 | Jeong .................. B60H 1/3213 |
| 2021/0280925 A1* | 9/2021 | Yoshinori ......... H01M 10/6569 |

FOREIGN PATENT DOCUMENTS

| | | |
|---|---|---|
| CN | 207984502 U | 10/2018 |
| CN | 209381733 U | 9/2019 |
| CN | 110329113 A | 10/2019 |
| CN | 110770070 A | 2/2020 |
| CN | 111403843 A | 7/2020 |
| DE | 102011090147 A1 | 7/2013 |
| DE | 102017011430 A1 | 6/2018 |
| FR | 3081123 A1 | 11/2019 |
| JP | 2017077880 A | 4/2017 |
| WO | 2018069629 A1 | 4/2018 |

* cited by examiner

VEHICLE THERMAL MANAGEMENT SYSTEM AND METHOD

CROSS-REFERENCE TO RELATED APPLICATIONS

This application is a continuation of International Application No. PCT/CN2020/126085, filed on Nov. 3, 2020, which claims priority to Chinese Patent Application No. 202010099920.9, filed on Feb. 18, 2020. The aforementioned patent applications are hereby incorporated by reference in their entireties.

TECHNICAL FIELD

This application relates to the vehicle field, and in particular, to a vehicle thermal management system and method.

BACKGROUND

Battery powered electric vehicles are becoming increasingly popular in the market, and consumers are demanding higher power performance and more driving pleasure of the electric vehicles. To meet usage needs of consumers in some special environments, an electric motor in a power assembly is developing towards a trend of high-rotational-speed and high-torque output. Due to the high-torque and high-rotational-speed output that are less frequently required in a normal driving scenario, peak heat dissipation requirements of the power assembly (including the electric motor (EM) and a motor control unit (MCU)) and a battery pack system increase greatly. How to meet the heat dissipation requirements poses a great challenge to a thermal management system.

In a current vehicle thermal management system, heat dissipation of a battery pack is usually connected in series to heat dissipation of a power assembly, and a coolant from the battery pack further enters the power assembly for heat dissipation. However, in the serial connection manner, the battery pack and the power assembly have to be equally cold or hot.

Because a comfortable temperature interval of the battery pack is relatively narrow, and an outlet temperature of a coolant passing through the battery pack cannot be too low, an inlet coolant temperature of the power assembly is still limited by the battery pack, and cannot experience separate natural heat dissipation to achieve a most energy-saving working condition.

SUMMARY

Embodiments of this application provide a vehicle thermal management system and method, so as to implement refrigeration heat dissipation on a power assembly and a battery pack at the same time, separate refrigeration heat dissipation on the power assembly or the battery pack, and separate natural heat dissipation on the power assembly or the battery pack, thereby achieving a most energy-saving working condition.

According to a first aspect, an embodiment of this application provides a vehicle thermal management system. The vehicle thermal management system includes: a refrigeration cycle system, a coolant cycle system, and a control device. The coolant cycle system includes a coolant cycle frontend radiator, a power assembly heat dissipation system, a battery pack heat dissipation system, a primary path water pump, a bypass water pump, and a valve bank system. The refrigeration cycle system is connected to the primary path water pump, so that the refrigeration cycle system pumps, by using the primary path water pump, a cooled coolant to the battery pack heat dissipation system and/or the power assembly heat dissipation system. The power assembly heat dissipation system and the battery pack heat dissipation system share the refrigeration cycle system and the coolant cycle frontend radiator by using the primary path water pump, the bypass water pump, and a combination of the valve bank system. The control device controls a heat dissipation mode of the power assembly heat dissipation system and a heat dissipation mode of the battery pack heat dissipation system based on an ambient temperature and an inlet coolant temperature of a power assembly.

In this embodiment, the inlet coolant temperature of the power assembly is calculated based on a working state of the power assembly, and a parameter of the working state includes information such as a rotational speed, torque, and an MCU current of the power assembly. In embodiments, the inlet coolant temperature of the power assembly is also used to indicate that the inlet coolant temperature needs to reach a specific value, so that the power assembly heat dissipation system can ensure that after heat dissipation, each component of the power assembly does not work at an overtemperature.

In the vehicle thermal management system provided in this embodiment, the refrigeration cycle system may perform freezing processing on the coolant to reduce a temperature of the coolant to a required range, and the coolant cycle system may reduce the temperature of the coolant to the required range through natural heat dissipation. The vehicle thermal management system determines the heat dissipation mode of the battery pack heat dissipation system and the heat dissipation mode of the power assembly heat dissipation system based on the ambient temperature and the inlet coolant temperature of the power assembly. That is, the power assembly heat dissipation system and the battery pack heat dissipation system can independently use different heat dissipation modes, or can use a same heat dissipation mode. In this way, a most energy-saving working condition can be achieved based on an actual situation.

Optionally, that the control device controls a heat dissipation mode of the power assembly heat dissipation system and a heat dissipation mode of the battery pack heat dissipation system based on an ambient temperature and an inlet coolant temperature of a power assembly may be as follows:

When the ambient temperature is lower than a first preset threshold and the inlet coolant temperature is within a first preset range, the control device controls the power assembly heat dissipation system to use a natural heat dissipation mode, and controls the battery pack heat dissipation system to also use the natural heat dissipation mode;

when the ambient temperature is lower than the first preset threshold and the inlet coolant temperature is within a second preset range, the control device controls the power assembly heat dissipation system to use a refrigeration heat dissipation mode, and controls the battery pack heat dissipation system to use the natural heat dissipation mode;

when the ambient temperature is higher than or equal to the first preset threshold and the inlet coolant temperature is within the first preset range, the control device controls the power assembly heat dissipation system to use the natural heat dissipation mode, and controls the battery pack heat dissipation system to use the refrigeration heat dissipation mode; and when the ambient temperature is higher than or equal to the first preset threshold and the inlet coolant temperature is within the second preset range, the control device controls the power assembly heat dissipation system to use the refrigeration heat dissipation mode, and controls the battery pack heat dissipation system to use the refrigeration heat dissipation mode, where the first preset threshold is a temperature range during normal working of the battery pack, the first preset range is a required range of the inlet coolant temperature in a normal working mode of the power assembly heat dissipation system, and the second preset range is a required range of the inlet coolant temperature during high-torque high-output working of the power assembly. The high-torque and high-output working of the power assembly generally refers to a working state in which the vehicle needs to run at a high speed or climb a slope, and the like, and the normal working mode of the power assembly is an opposite working state.

In this embodiment, the control device controls the heat dissipation mode of the battery pack heat dissipation system based on the ambient temperature, and the control device controls the heat dissipation mode of the power assembly heat dissipation system based on the inlet coolant temperature, so as to implement separate control on each of the battery pack heat dissipation system and the power assembly heat dissipation system, thereby achieving a most energy-saving working condition.

Based on the foregoing solutions, the following describes different working conditions of the battery pack heat dissipation system and the power assembly heat dissipation system.

In a working condition, both the battery pack heat dissipation system and the power assembly heat dissipation system use the natural heat dissipation mode, which is as follows:

The control device controls the primary path water pump in the vehicle thermal management system to be turned off, the bypass water pump to be turned on, and an on-off combination of the valve bank system to cause the coolant cycle frontend radiator, the bypass water pump, the battery pack heat dissipation system, and the power assembly heat dissipation system to be connected in series. In a cycle, a coolant at a first temperature passes through the coolant cycle frontend radiator to become a coolant at a second temperature, and in this case, the second temperature is lower than the first temperature. Then, the bypass water pump pumps the coolant at the second temperature to pass through the battery pack heat dissipation system to become a coolant at a third temperature, and in this case, the third temperature is higher than the second temperature. Then, the bypass water pump pumps the coolant at the third temperature to pass through the power assembly heat dissipation system to become the coolant at the first temperature, and in this case, the first temperature is higher than the third temperature. Finally, the bypass water pump pumps the coolant at the first temperature to the coolant cycle frontend radiator. Then, after the coolant passes through the coolant cycle frontend radiator, the foregoing operations continue. It may be understood that the first temperature, the second temperature, and the third temperature each indicate a temperature range. For example, the third temperature may be a comfortable temperature interval of the battery pack (for example, 60 degrees Celsius to 65 degrees Celsius), the second temperature may be 15 degrees Celsius to 20 degrees Celsius, and the first temperature may be 90 degrees Celsius to 95 degrees Celsius. That is, the coolant cycle frontend radiator only needs to ensure that the power assembly and the battery pack do not work at an overtemperature.

In a working condition, the battery pack heat dissipation system uses the natural heat dissipation mode, and the power assembly heat dissipation system uses the refrigeration heat dissipation mode, which is as follows:

The control device controls the refrigeration cycle system to be enabled; the primary path water pump to be turned on; the bypass water pump to be turned on; and an on-off combination of valve banks of the valve bank system to cause the coolant cycle frontend radiator, the bypass water pump, and the battery pack heat dissipation system to be connected in series, the power assembly heat dissipation system, the refrigeration cycle system, and the primary path water pump to be connected in series, and the battery pack heat dissipation system and a branch in which the power assembly heat dissipation system is located to be connected in parallel. In a cycle, a coolant at a fourth temperature passes through the coolant cycle frontend radiator to become a coolant at a fifth temperature. Then, the bypass water pump pumps the coolant at the fifth temperature to pass through the battery pack heat dissipation system to become the coolant at the fourth temperature, and in this case, the fourth temperature is greater than the fifth temperature. Then, the bypass water pump pumps the coolant at the fourth temperature to the coolant frontend radiator. Then, after the coolant passes through the coolant cycle frontend radiator, the foregoing operations continue. In addition, in a cycle, a coolant at a sixth temperature experiences refrigeration of the refrigeration cycle system to become a coolant at a seventh temperature. The primary path water pump pumps the coolant at the seventh temperature to the power assembly heat dissipation system to become the coolant at the sixth temperature. Then, the primary path water pump pumps the coolant at the sixth temperature to the refrigeration cycle system. After the coolant passes through the refrigeration cycle system, the foregoing operations continue. It may be understood that the fourth temperature, the fifth temperature, the sixth temperature, and the seventh temperature in this embodiment each indicate a temperature range. In this working condition, because a vehicle is in a working mode of high torque and high output, the natural heat dissipation cannot meet heat dissipation of the power assembly heat dissipation system on the power assembly, and the power assembly heat dissipation system switches to refrigeration heat dissipation. In addition, a current ambient temperature is appropriate, and the natural heat dissipation can meet a heat dissipation requirement of the battery pack. Therefore, the battery pack heat dissipation system uses the natural heat dissipation, which can effectively reduce refrigeration power consumption.

In a working condition, the battery pack heat dissipation system uses the refrigeration heat dissipation mode, and the power assembly heat dissipation system uses the natural heat dissipation mode, which is as follows:

The control device controls the refrigeration cycle system to be enabled; the primary path water pump to be turned on; the bypass water pump to be turned on; and an on-off combination of valve banks in the valve bank system to cause the coolant cycle frontend radiator, the bypass water pump, and the power assembly heat dissipation system to be connected in series, the battery pack heat dissipation system, the refrigeration cycle system, and the primary path water pump to be connected in series, and the battery pack heat dissipation system and a branch in which the power assembly heat dissipation system is located to be connected in parallel. In a cycle, a coolant at an eighth temperature passes through the coolant cycle frontend radiator to become a coolant at a ninth temperature. Then, the bypass water pump pumps the coolant at the ninth temperature to pass through the power assembly heat dissipation system to become the coolant at the eighth temperature. Then, the bypass water pump pumps the coolant at the eighth temperature to the coolant cycle frontend radiator; and the previous operation continues. In addition, in a cycle, a coolant at a tenth temperature experiences refrigeration of the refrigeration cycle system to become a coolant at an eleventh temperature, and in this case, the eleventh temperature is lower than the tenth temperature. Then, the primary path water pump pumps the coolant at the eleventh temperature to pass through the battery pack heat dissipation system to become the coolant at the tenth temperature. Then, the primary path water pump pumps the coolant at the tenth temperature to the refrigeration cycle system; and then the previous operation continues. It may be understood that the eighth temperature, the ninth temperature, the tenth temperature, and the eleventh temperature in this embodiment each indicate a temperature range. In this working condition, due to an excessive ambient temperature, the natural heat dissipation cannot meet heat dissipation of the battery pack heat dissipation system on the battery pack. Therefore, the battery pack heat dissipation system switches to refrigeration heat dissipation. In addition, the power assembly is in a normal working mode, and natural heat dissipation can meet a heat dissipation requirement of each component of the power assembly. Therefore, the power assembly heat dissipation system uses natural heat dissipation, which can effectively reduce refrigeration power consumption.

In a working condition, the battery pack heat dissipation system uses the refrigeration heat dissipation mode, and the power assembly heat dissipation system uses the refrigeration heat dissipation mode, which is as follows:

The control device controls the refrigeration cycle system to be enabled; the primary path water pump to be turned on; the bypass water pump to be turned off; an on-off combination of valve banks in the valve bank system to cause the power assembly heat dissipation system, the refrigeration cycle system, and the primary path water pump to be connected in series; and the valve bank system to cause the battery pack heat dissipation system, the refrigeration cycle system, and the primary path water pump to be connected in series, and the battery pack heat dissipation system and a branch in which the power assembly heat dissipation system is located to be connected in parallel. In a cycle, a coolant experiences refrigeration of the refrigeration cycle system to become a coolant at a twelfth temperature. Then, the primary path water pump pumps the coolant at the twelfth temperature to pass through the battery pack heat dissipation system to become a coolant at a thirteenth temperature, where the thirteenth temperature is greater than the twelfth temperature. In addition, the primary path water pump pumps the coolant at the twelfth temperature to pass through the power assembly heat dissipation system to become a coolant at a fourteenth temperature, where the fourteenth temperature is greater than the twelfth temperature. Then, the primary path water pump separately pumps the coolant at the thirteenth temperature and the coolant at the fourteenth temperature to the refrigeration cycle system; and then the foregoing operations continue. It may be understood that the twelfth temperature, the thirteenth temperature, and the fourteenth temperature in this embodiment each indicate a temperature range. In this working condition, due to an excessive ambient temperature, the natural heat dissipation cannot meet heat dissipation of the battery pack heat dissipation system on the battery pack. Therefore, the battery pack heat dissipation system switches to refrigeration heat dissipation. In addition, the power assembly is in a working mode of high torque and high output, and the natural heat dissipation cannot meet a heat dissipation requirement of each component of the power assembly. Therefore, the power assembly heat dissipation system switches to refrigeration heat dissipation, which can effectively ensure that each component in the vehicle does not work at an overtemperature.

In this working condition, the control device may further control the bypass water pump to be turned on. In this case, the power assembly heat dissipation system is connected in series to the coolant cycle frontend radiator and the bypass water pump by using the valve bank system. The bypass water pump pumps a first-part coolant of the coolant at the fourteenth temperature to the coolant cycle frontend radiator to become the coolant at the twelfth temperature. Then, the bypass water pump pumps the coolant at the twelfth temperature to the power assembly heat dissipation system, and repeats the foregoing operations. The primary path water pump pumps a second-part coolant of the coolant at the fourteenth temperature to the refrigeration cycle system to obtain the coolant at the twelfth temperature after refrigeration, pumps the coolant at the twelfth temperature to the power assembly heat dissipation system, and repeats the foregoing operations. A sum of a volume of the first-part coolant and a volume of the second-part coolant is equal to a volume of an entire coolant passing through the power assembly heat dissipation system. In this solution, when pumping the first-part coolant by using the bypass water pump, the control device further needs to control a rotational speed of the bypass water pump based on an inlet coolant temperature of the power assembly, so as to control the volume of the first-part coolant. In this working condition, the control device may control most of heat of the power assembly to be discharged into the air in a natural heat dissipation manner, thereby reducing refrigeration energy consumption of the refrigeration cycle system.

Based on the foregoing solutions, optionally, the refrigeration cycle system may include a compressor, a condenser, an electronic expansion valve, a liquid cooling evaporator, and a receiver drier, so as to implement a vapor compression refrigeration cycle effect. The coolant cycle system further includes a water tank, and the water tank is configured to supplement a loss of the coolant.

According to a second aspect, an embodiment of this application provides a vehicle thermal management method, and the method is applied to the vehicle thermal management system described in the first aspect. The method is as follows: The control device obtains an ambient temperature, a working rotational speed of the power assembly, output torque of the power assembly, and a motor control unit MCU current; the control device calculates an inlet coolant temperature of the power assembly based on the ambient temperature, the working rotational speed, the output torque, and the MCU current; and the control device controls a heat dissipation mode of the power assembly heat dissipation system and a heat dissipation mode of the battery pack heat dissipation system based on the inlet coolant temperature and the ambient temperature, where the heat dissipation mode includes natural heat dissipation and refrigeration heat dissipation, the natural heat dissipation is heat dissipation using the coolant cycle system, and the refrigeration heat dissipation is heat dissipation using the refrigeration cycle system.

In this embodiment, the inlet coolant temperature of the power assembly is calculated based on a working state of the power assembly, and a parameter of the working state includes information such as a rotational speed, torque, and an MCU current of the power assembly. In embodiments, the inlet coolant temperature of the power assembly is also used to indicate that the inlet coolant temperature needs to reach a specific value, so that the power assembly heat dissipation system can ensure that after heat dissipation, each component of the power assembly does not work at an overtemperature.

In the vehicle thermal management system provided in this embodiment, the refrigeration cycle system may perform freezing processing on the coolant to reduce a temperature of the coolant to a required range, and the coolant cycle system may reduce the temperature of the coolant to the required range through natural heat dissipation. The control device determines the heat dissipation mode of the battery pack heat dissipation system and the heat dissipation mode of the power assembly heat dissipation system based on the ambient temperature and the inlet coolant temperature of the power assembly. That is, the power assembly heat dissipation system and the battery pack heat dissipation system can independently use different heat dissipation modes, or can use a same heat dissipation mode. In this way, a most energy-saving working condition can be achieved based on an actual situation.

Optionally, that the control device controls a heat dissipation mode of the power assembly heat dissipation system and a heat dissipation mode of the battery pack heat dissipation system based on an ambient temperature and an inlet coolant temperature of a power assembly may be as follows:

When the ambient temperature is lower than a first preset threshold and the inlet coolant temperature is within a first preset range, the control device controls the power assembly heat dissipation system to use a natural heat dissipation mode, and controls the battery pack heat dissipation system to also use the natural heat dissipation mode;
when the ambient temperature is lower than the first preset threshold and the inlet coolant temperature is within a second preset range, the control device controls the power assembly heat dissipation system to use a refrigeration heat dissipation mode, and controls the battery pack heat dissipation system to use the natural heat dissipation mode;
when the ambient temperature is higher than or equal to the first preset threshold and the inlet coolant temperature is within the first preset range, the control device controls the power assembly heat dissipation system to use the natural heat dissipation mode, and controls the battery pack heat dissipation system to use the refrigeration heat dissipation mode; and
when the ambient temperature is higher than or equal to the first preset threshold and the inlet coolant temperature is within the second preset range, the control device controls the power assembly heat dissipation system to use the refrigeration heat dissipation mode, and controls the battery pack heat dissipation system to use the refrigeration heat dissipation mode, where
the first preset threshold is a temperature range during normal working of the battery pack, the first preset range is a required range of the inlet coolant temperature in a normal working mode of the power assembly heat dissipation system, and the second preset range is a required range of the inlet coolant temperature during high-torque high-output working of the power assembly. The high-torque and high-output working of the power assembly generally refers to a working state in which the vehicle needs to run at a high speed or climb a slope, and the like, and the normal working mode of the power assembly is an opposite working state.

In this embodiment, the control device controls the heat dissipation mode of the battery pack heat dissipation system based on the ambient temperature, and the control device controls the heat dissipation mode of the power assembly heat dissipation system based on the inlet coolant temperature, so as to implement separate control on each of the battery pack heat dissipation system and the power assembly heat dissipation system, thereby achieving a most energy-saving working condition.

Based on the foregoing solutions, the following describes different working conditions of the battery pack heat dissipation system and the power assembly heat dissipation system.

In a working condition, both the battery pack heat dissipation system and the power assembly heat dissipation system use the natural heat dissipation mode, which is as follows:

The control device controls the primary path water pump in the vehicle thermal management system to be turned off, the bypass water pump to be turned on, and an on-off combination of the valve bank system to cause the coolant cycle frontend radiator, the bypass water pump, the battery pack heat dissipation system, and the power assembly heat dissipation system to be connected in series. In a cycle, a coolant at a first temperature passes through the coolant cycle frontend radiator to become a coolant at a second temperature, and in this case, the second temperature is lower than the first temperature. Then, the bypass water pump pumps the coolant at the second temperature to pass through the battery pack heat dissipation system to become a coolant at a third temperature, and in this case, the third temperature is higher than the second temperature. Then, the bypass water pump pumps the coolant at the third temperature to pass through the power assembly heat dissipation system to become the coolant at the first temperature, and in this case, the first temperature is higher than the third temperature. Finally, the bypass water pump pumps the coolant at the first temperature to the coolant cycle frontend radiator. Then, after the coolant passes through the coolant cycle frontend radiator, the foregoing operations continue. It may be understood that the first temperature, the second temperature, and the third temperature each indicate a temperature range. For example, the third temperature may be a comfortable temperature interval of the battery pack (for example, 60 degrees Celsius to 65 degrees Celsius), the second temperature may be 15 degrees Celsius to 20 degrees Celsius, and the first temperature may be 90 degrees Celsius to 95 degrees Celsius. That is, the coolant cycle frontend radiator only needs to ensure that the power assembly and the battery pack do not work at an overtemperature.

In a working condition, the battery pack heat dissipation system uses the natural heat dissipation mode, and the power assembly heat dissipation system uses the refrigeration heat dissipation mode, which is as follows:

The control device controls the refrigeration cycle system to be enabled; the primary path water pump to be turned on; the bypass water pump to be turned on; and an on-off combination of valve banks of the valve bank system to cause the coolant cycle frontend radiator, the bypass water pump, and the battery pack heat dissipation system to be connected in series, the power assembly heat dissipation system, the refrigeration cycle system, and the primary path water pump to be connected in series, and the battery pack heat dissipation system and a branch in which the power assembly heat dissipation system is located to be connected in parallel. In a cycle, a coolant at a fourth temperature passes through the coolant cycle frontend radiator to become a coolant at a fifth temperature. Then, the bypass water pump pumps the coolant at the fifth temperature to pass through the battery pack heat dissipation system to become the coolant at the fourth temperature, and in this case, the fourth temperature is greater than the fifth temperature. Then, the bypass water pump pumps the coolant at the fourth temperature to the coolant frontend radiator. Then, after the coolant passes through the coolant cycle frontend radiator, the foregoing operations continue. In addition, in a cycle, a coolant at a sixth temperature experiences refrigeration of the refrigeration cycle system to become a coolant at a seventh temperature. The primary path water pump pumps the coolant at the seventh temperature to the power assembly heat dissipation system to become the coolant at the sixth temperature. Then, the primary path water pump pumps the coolant at the sixth temperature to the refrigeration cycle system. After the coolant passes through the refrigeration cycle system, the foregoing operations continue. It may be understood that the fourth temperature, the fifth temperature, the sixth temperature, and the seventh temperature in this embodiment each indicate a temperature range. In this working condition, because a vehicle is in a working mode of high torque and high output, the natural heat dissipation cannot meet heat dissipation of the power assembly heat dissipation system on the power assembly, and the power assembly heat dissipation system switches to refrigeration heat dissipation. In addition, a current ambient temperature is appropriate, and the natural heat dissipation can meet a heat dissipation requirement of the battery pack. Therefore, the battery pack heat dissipation system uses the natural heat dissipation, which can effectively reduce refrigeration power consumption.

In a working condition, the battery pack heat dissipation system uses the refrigeration heat dissipation mode, and the power assembly heat dissipation system uses the natural heat dissipation mode, which is as follows:

The control device controls the refrigeration cycle system to be enabled, the primary path water pump to be turned on; the bypass water pump to be turned on; and an on-off combination of valve banks in the valve bank system to cause the coolant cycle frontend radiator, the bypass water pump, and the power assembly heat dissipation system to be connected in series, the battery pack heat dissipation system, the refrigeration cycle system, and the primary path water pump to be connected in series, and the battery pack heat dissipation system and a branch in which the power assembly heat dissipation system is located to be connected in parallel. In a cycle, a coolant at an eighth temperature passes through the coolant cycle frontend radiator to become a coolant at a ninth temperature. Then, the bypass water pump pumps the coolant at the ninth temperature to pass through the power assembly heat dissipation system to become the coolant at the eighth temperature. Then, the bypass water pump pumps the coolant at the eighth temperature to the coolant cycle frontend radiator; and the previous operation continues. In addition, in a cycle, a coolant at a tenth temperature experiences refrigeration of the refrigeration cycle system to become a coolant at an eleventh temperature, and in this case, the eleventh temperature is lower than the tenth temperature. Then, the primary path water pump pumps the coolant at the eleventh temperature to pass through the battery pack heat dissipation system to become the coolant at the tenth temperature. Then, the primary path water pump pumps the coolant at the tenth temperature to the refrigeration cycle system; and then the previous operation continues. It may be understood that the eighth temperature, the ninth temperature, the tenth temperature, and the eleventh temperature in this embodiment each indicate a temperature range. In this working condition, due to an excessive ambient temperature, the natural heat dissipation cannot meet heat dissipation of the battery pack heat dissipation system on the battery pack. Therefore, the battery pack heat dissipation system switches to refrigeration heat dissipation. In addition, the power assembly is in a normal working mode, and natural heat dissipation can meet a heat dissipation requirement of each component of the power assembly. Therefore, the power assembly heat dissipation system uses natural heat dissipation, which can effectively reduce refrigeration power consumption.

In a working condition, the battery pack heat dissipation system uses the refrigeration heat dissipation mode, and the power assembly heat dissipation system uses the refrigeration heat dissipation mode, which is as follows:

The control device controls the refrigeration cycle system to be enabled; the primary path water pump to be turned on; the bypass water pump to be turned off; an on-off combination of valve banks in the valve bank system to cause the power assembly heat dissipation system, the refrigeration cycle system, and the primary path water pump to be connected in series; and the valve bank system to cause the battery pack heat dissipation system, the refrigeration cycle system, and the primary path water pump to be connected in series, and the battery pack heat dissipation system and a branch in which the power assembly heat dissipation system is located to be connected in parallel. In a cycle, a coolant experiences refrigeration of the refrigeration cycle system to become a coolant at a twelfth temperature. Then, the primary path water pump pumps the coolant at the twelfth temperature to pass through the battery pack heat dissipation system to become a coolant at a thirteenth temperature, where the thirteenth temperature is greater than the twelfth temperature. In addition, the primary path water pump pumps the coolant at the twelfth temperature to pass through the power assembly heat dissipation system to become a coolant at a fourteenth temperature, where the fourteenth temperature is greater than the twelfth temperature. Then, the primary path water pump separately pumps the coolant at the thirteenth temperature and the coolant at the fourteenth temperature to the refrigeration cycle system; and then the foregoing operations continue. It may be understood that the twelfth temperature, the thirteenth temperature, and the fourteenth temperature in this embodiment each indicate a temperature range. In this working condition, due to an excessive ambient temperature, the natural heat dissipation cannot meet heat dissipation of the battery pack heat dissipation system on the battery pack. Therefore, the battery pack heat dissipation system switches to refrigeration heat dissipation. In addition, the power assembly is in a working mode of high torque and high output, and the natural heat dissipation cannot meet a heat dissipation requirement of each component of the power assembly. Therefore, the power assembly heat dissipation system switches to refrigeration heat dissipation, which can effectively ensure that each component in the vehicle does not work at an overtemperature.

In this working condition, the control device may further control the bypass water pump to be turned on. In this case, the power assembly heat dissipation system is connected in series to the coolant cycle frontend radiator and the bypass water pump by using the valve bank system. The bypass water pump pumps a first-part coolant of the coolant at the fourteenth temperature to the coolant cycle frontend radiator to become the coolant at the twelfth temperature. Then, the bypass water pump pumps the coolant at the twelfth temperature to the power assembly heat dissipation system, and repeats the foregoing operations. The primary path water pump pumps a second-part coolant of the coolant at the fourteenth temperature to the refrigeration cycle system to obtain the coolant at the twelfth temperature after refrigeration, pumps the coolant at the twelfth temperature to the power assembly heat dissipation system, and repeats the foregoing operations. A sum of a volume of the first-part coolant and a volume of the second-part coolant is equal to a volume of an entire coolant passing through the power assembly heat dissipation system. In this solution, when pumping the first-part coolant by using the bypass water pump, the control device further needs to control a rotational speed of the bypass water pump based on an inlet coolant temperature of the power assembly, so as to control the volume of the first-part coolant. In this working condition, the control device may control most of heat of the power assembly to be discharged into the air in a natural heat dissipation manner, thereby reducing refrigeration energy consumption of the refrigeration cycle system.

Based on the foregoing solutions, optionally, the refrigeration cycle system may include a compressor, a condenser, an electronic expansion valve, a liquid cooling evaporator, and a receiver drier, so as to implement a vapor compression refrigeration cycle effect. The coolant cycle system further includes a water tank, and the water tank is configured to supplement a loss of the coolant.

According to a third aspect, an embodiment of this application provides an electric vehicle, where the electric vehicle includes a battery pack, a power assembly, and the vehicle thermal management system according to the first aspect, and the vehicle thermal management system is configured to perform heat dissipation on the battery pack and the power assembly. In addition, the vehicle thermal management system may be further applied to the vehicle thermal management method according to the second aspect.

DESCRIPTION OF EMBODIMENTS

Embodiments of this application provide a vehicle thermal management system and method, so as to implement refrigeration heat dissipation on a power assembly and a battery pack at the same time, separate refrigeration heat dissipation on the power assembly or the battery pack, and separate natural heat dissipation on the power assembly or the battery pack, thereby achieving a most energy-saving working condition.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Figure 1:
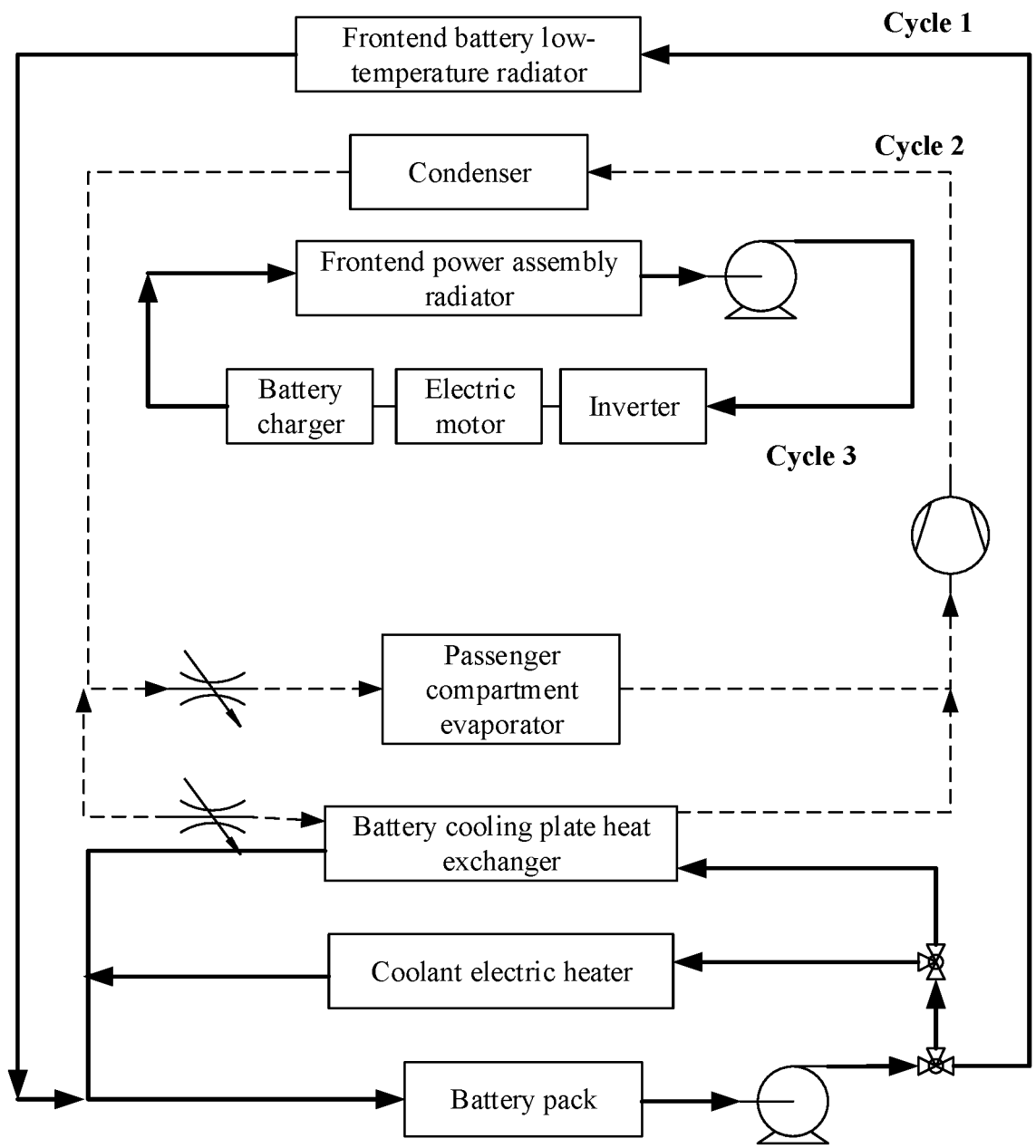
FIG. 1 is a diagram of an example solution of heat dissipation on a battery pack and a power assembly that are connected in series.
Figure 2:
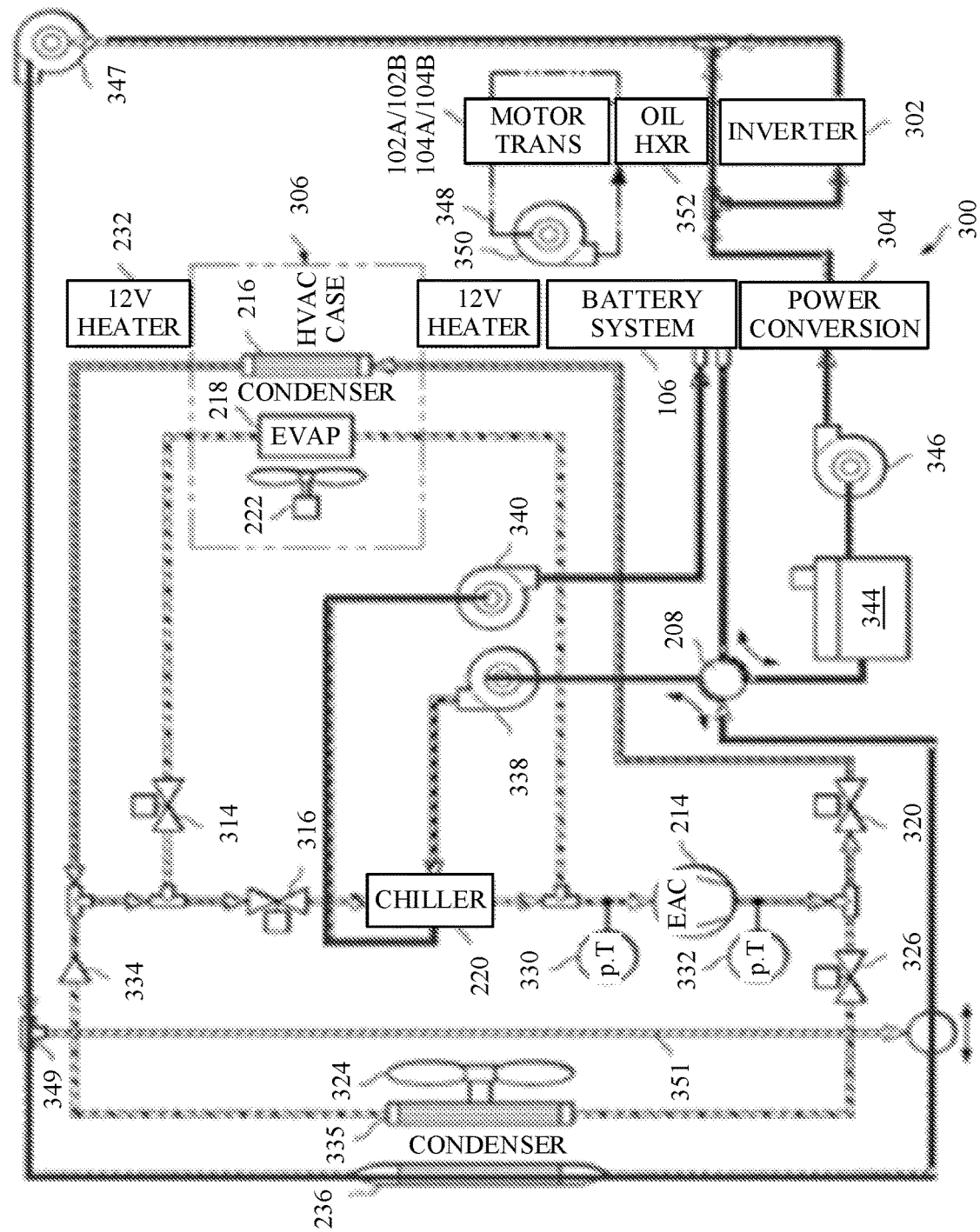
FIG. 2 is a diagram of another example solution of heat dissipation on a battery pack and a power assembly that are connected in series.

Battery electric vehicles are becoming increasingly popular in the market, and consumers are demanding higher power performance and more driving pleasure of the electric vehicles. To meet usage needs of consumers in some special environments, an electric motor in a power assembly is developing towards a trend of high-rotational-speed and high-torque output. Due to the high-torque and high-rotational-speed output that is less frequently required in a normal driving scenario, peak heat dissipation requirements of the power assembly (the EM and an MCU) and a battery pack system increase greatly. How to meet the heat dissipation requirements poses a great challenge to a thermal management system. A current vehicle thermal management system may use heat dissipation modes shown in FIG. 1 and FIG. 2. It may be learned from the heat dissipation modes shown in FIG. 1 and FIG. 2 that, currently, heat dissipation of a battery pack is usually connected in series to heat dissipation of a power assembly, and a coolant from the battery pack further enters the power assembly for heat dissipation. However, in the serial connection manner, the battery pack and the power assembly have to be equally cold or hot. Because a comfortable temperature interval of the battery pack is relatively narrow, and an outlet temperature of a coolant passing through the battery pack cannot be too low, an inlet coolant temperature of the power assembly is still limited by the battery pack, and cannot experience separate natural heat dissipation to achieve a most energy-saving working condition.

Figure 3:
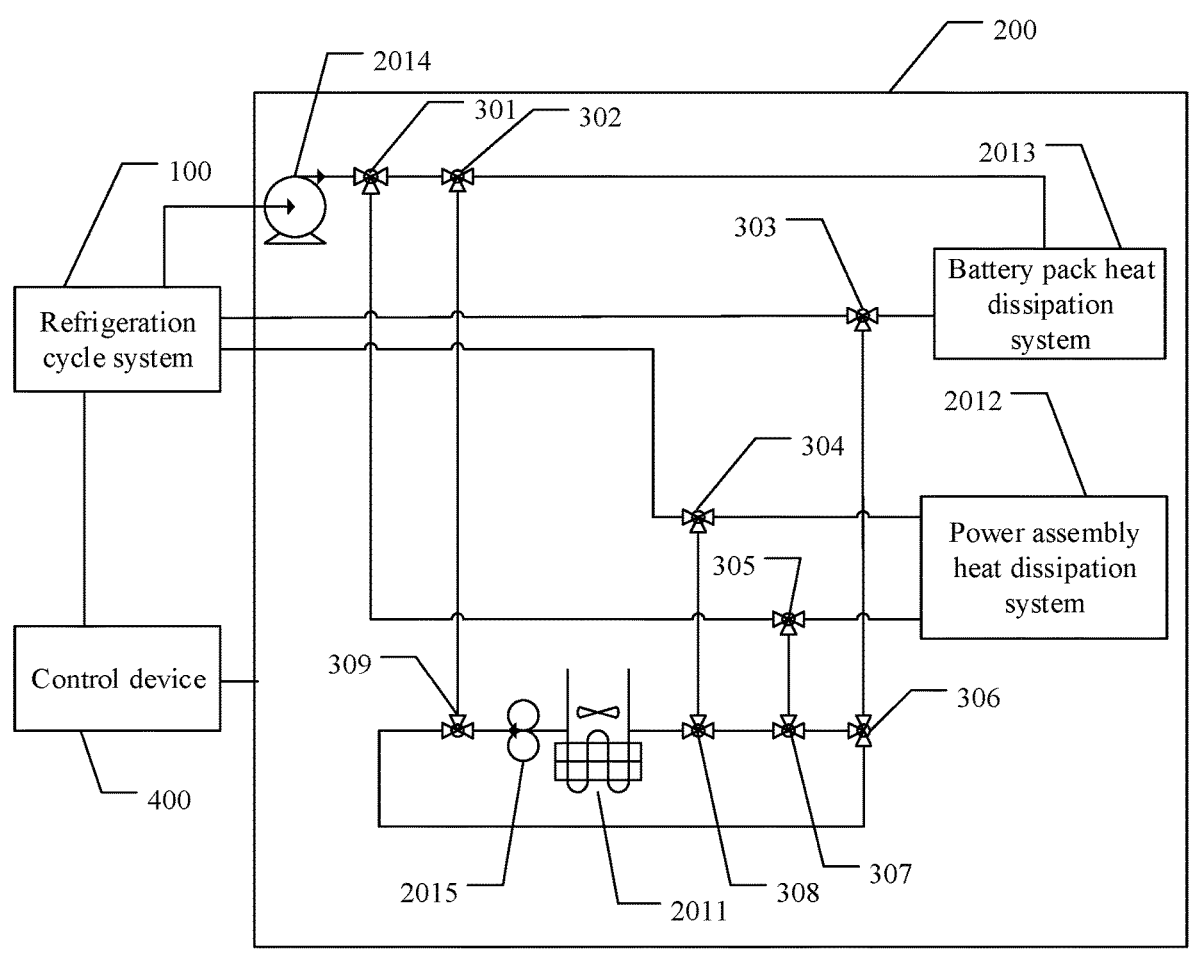
FIG. 3 is a schematic diagram of an embodiment of a vehicle thermal management system according to an embodiment of this application.

To resolve this problem, an embodiment of this application provides the following vehicle thermal management system. Referring to FIG. 3, the vehicle thermal management system includes: a refrigeration cycle system 100, a coolant cycle system 200, a valve bank system 300 (including a valve 301 to a valve 309), and a control device 400. The coolant cycle system 200 includes a coolant cycle frontend radiator 2011, a power assembly heat dissipation system 2012, a battery pack heat dissipation system 2013, a primary path water pump 2014, and a bypass water pump 2015. The refrigeration cycle system 100 is connected to the primary path water pump 2014, so that the refrigeration cycle system 100 pumps, by using the primary path water pump 2014, a cooled coolant to the battery pack heat dissipation system 2013 and/or the power assembly heat dissipation system 2012. The power assembly heat dissipation system 2012 and the battery pack heat dissipation system 2013 share the refrigeration cycle system 100 and the coolant cycle frontend radiator 2011 by using the primary path water pump 2014, the bypass water pump 2015, and a combination of the valve bank system 300. The control device 400 controls a heat dissipation mode of the power assembly heat dissipation system 2012 and a heat dissipation mode of the battery pack heat dissipation system 2013 based on an ambient temperature and an inlet coolant temperature of a power assembly.

It may be understood that, in this embodiment of this application, an example structure of the refrigeration cycle system in the vehicle thermal management system includes: a compressor, a condenser, an electronic expansion valve, an evaporator, and a receiver drier. In addition, the coolant cycle system may further include a water tank. Therefore, an example structure of the vehicle thermal management system may be shown in FIG. 4. The vehicle thermal management system includes a refrigeration cycle system 100, a coolant cycle system 200, a valve bank system 300 (including a valve 301 to a valve 309), and a control device 400. The refrigeration and compression system 100 includes: a compressor 1011, a condenser 1012, an electronic expansion valve 1013, an evaporator 1014, and a receiver drier 1015. The coolant cycle system 200 includes: a coolant cycle frontend radiator 2011, a power assembly heat dissipation system 2012, a battery pack heat dissipation system 2013, a primary path water pump 2014, a bypass water pump 2015, and a water tank 2016. The battery pack heat dissipation system 2013 includes a plurality of battery packs, and the power assembly heat dissipation system 2012 includes components such as an inverter, an oil cooler, and an electric motor.

Figure 4:
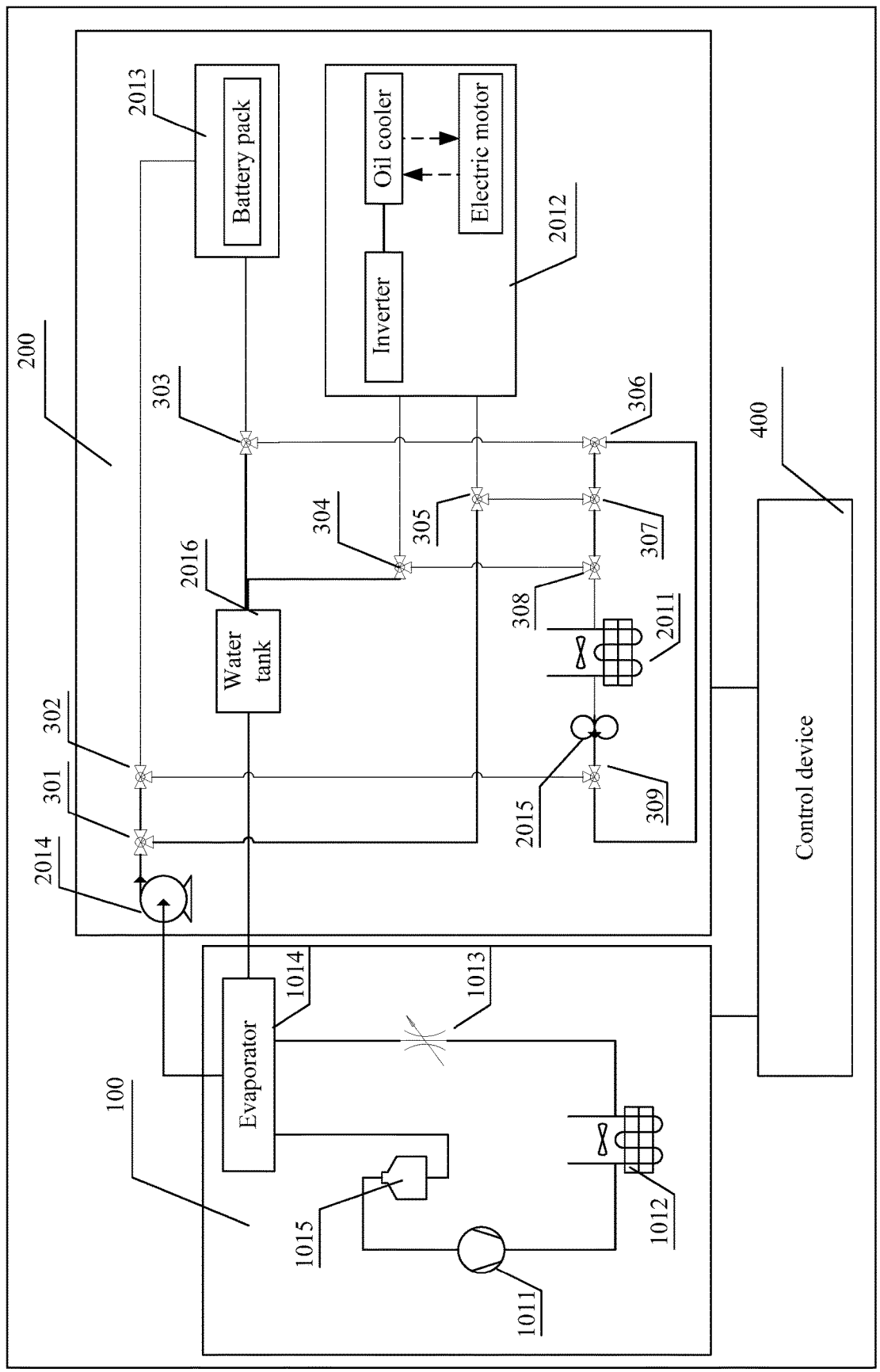
FIG. 4 is a schematic diagram of another embodiment of a vehicle thermal management system according to an embodiment of this application.

The following describes working conditions of the vehicle thermal management system shown in FIG. 4.

Figure 5:
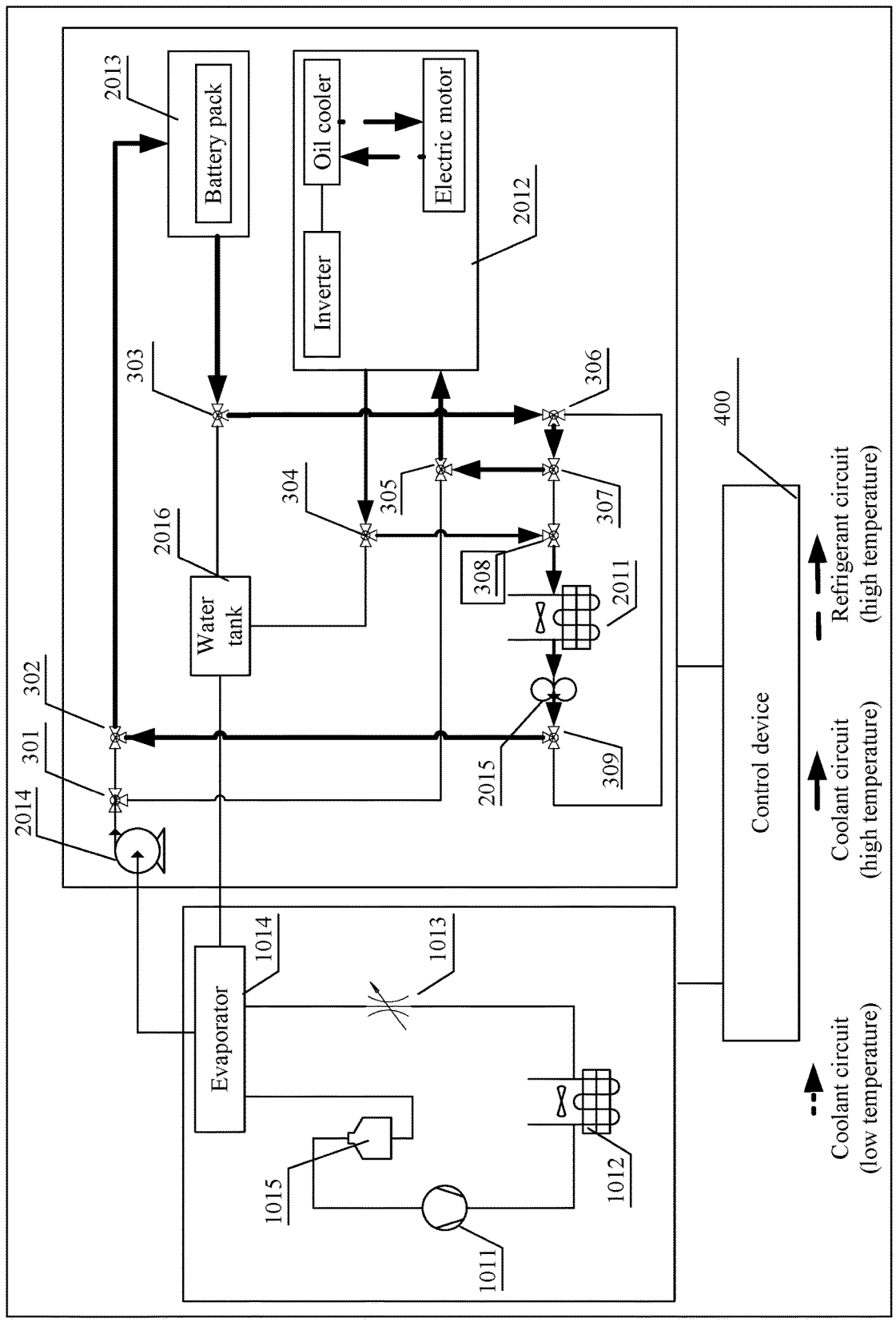
FIG. 5 is a schematic diagram of a heat dissipation circuit in a working condition of a vehicle thermal management system according to an embodiment of this application.

In a working condition, both the battery pack heat dissipation system and the power assembly heat dissipation system use a natural heat dissipation mode, and heat dissipation circuits of the battery pack heat dissipation system and the power assembly heat dissipation system are shown in FIG. 5.

The control device 400 controls the primary path water pump 2014 in the vehicle thermal management system to be turned off, and the bypass water pump 2015 to be turned on. In this case, on/off logic of each valve of the valve bank system 300 is shown in Table 1.

TABLE 1

| Valve | Left valve port | Upper valve port | Right valve port | Lower valve port |
|---|---|---|---|---|
| 301 | Random | — | Random | Random |
| 302 | Off | — | On | On |
| 303 | Off | — | On | On |
| 304 | Off | — | On | On |
| 305 | Off | — | On | On |
| 306 | On | On | — | Off |
| 307 | Off | On | On | — |
| 308 | On | On | Off | — |
| 309 | Off | On | On | — |

Figure 6:
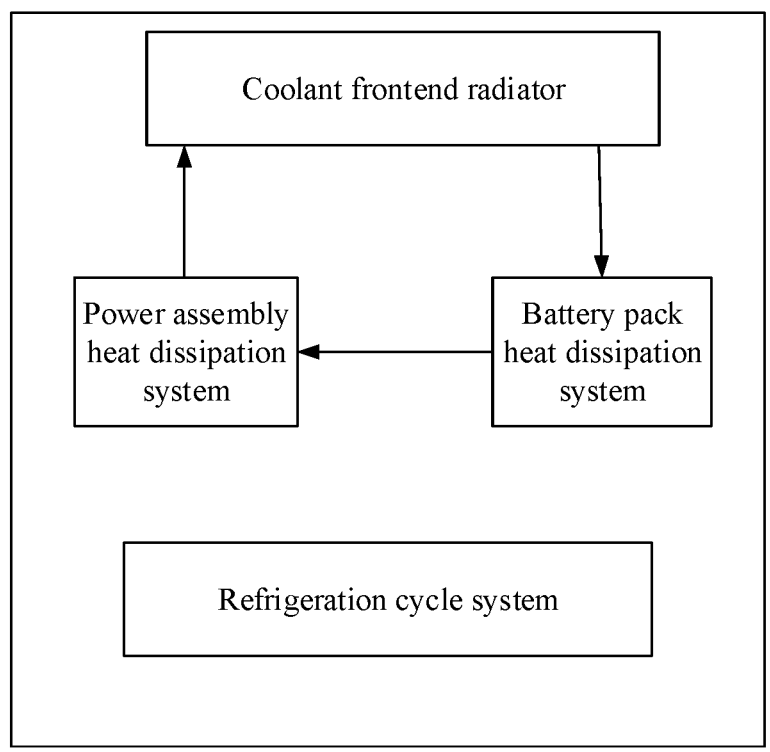
FIG. 6 is a schematic diagram of a heat dissipation topology in a working condition of a vehicle thermal management system according to an embodiment of this application.

It may be understood that "-" in the table is used to indicate that the valve does not have the valve port. It may be learned from the on/off logic of the valves in Table 1 that, in this case, the coolant cycle frontend radiator 2011, the bypass water pump 2015, the battery pack heat dissipation system 2013, and the power assembly heat dissipation system 2012 are connected in series. To be specific, a heat dissipation topology relationship between the battery pack heat dissipation system and the power assembly heat dissipation system may be shown in FIG. 6. In a cycle, a coolant at a first temperature passes through the coolant cycle frontend radiator to become a coolant at a second temperature, and in this case, the second temperature is lower than the first temperature. Then, the bypass water pump pumps the coolant at the second temperature to pass through the battery pack heat dissipation system to become a coolant at a third temperature, and in this case, the third temperature is higher than the second temperature. Then, the bypass water pump pumps the coolant at the third temperature to pass through the power assembly heat dissipation system to become the coolant at the first temperature, and in this case, the first temperature is higher than the third temperature. Finally, the bypass water pump pumps the coolant at the first temperature to the coolant cycle frontend radiator. Then, after the coolant passes through the coolant cycle frontend radiator, the foregoing operations continue. It may be understood that the first temperature, the second temperature, and the third temperature each indicate a temperature range. For example, the third temperature may be a comfortable temperature interval of the battery pack (for example, 60 degrees Celsius to 65 degrees Celsius), the second temperature may be 15 degrees Celsius to 20 degrees Celsius, and the first temperature may be 90 degrees Celsius to 95 degrees Celsius. That is, the coolant cycle frontend radiator only needs to ensure that the power assembly and the battery pack do not work at an overtemperature.

Figure 7:
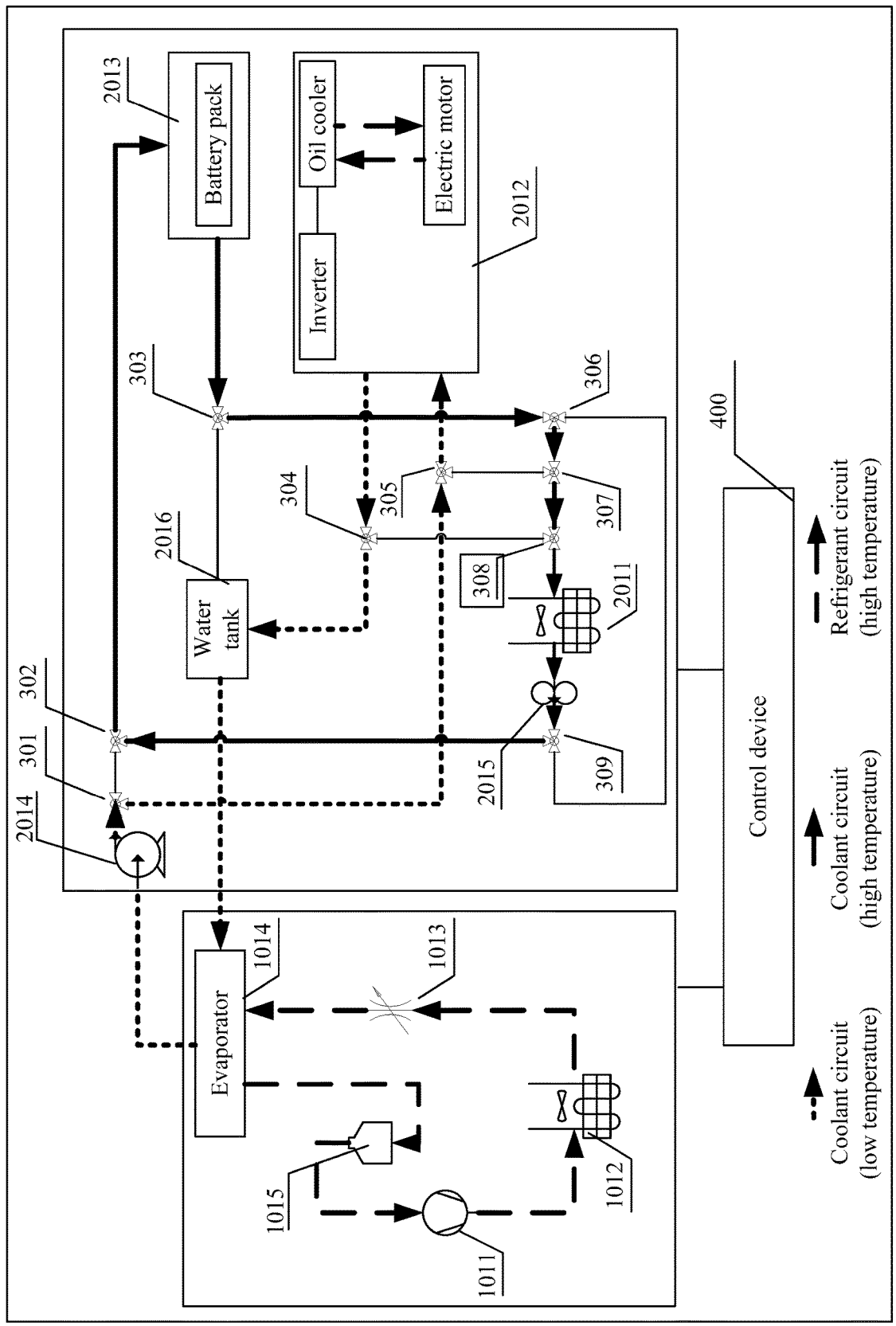
FIG. 7 is a schematic diagram of a heat dissipation circuit in another working condition of a vehicle thermal management system according to an embodiment of this application.

In a working condition, the battery pack heat dissipation system uses a natural heat dissipation mode, the power assembly heat dissipation system uses a refrigeration heat dissipation mode, and heat dissipation circuits of the battery pack heat dissipation system and the power assembly heat dissipation system are shown in FIG. 7.

The control device 400 controls the refrigeration cycle system 100 to be enabled, the primary path water pump 2014 to be turned on, and the bypass water pump 2015 to be turned on. In this case, on/off logic of each valve of the valve bank system 300 is shown in Table 2.

TABLE 2

| Valve | Left valve port | Upper valve port | Right valve port | Lower valve port |
|---|---|---|---|---|
| 301 | On | — | Off | On |
| 302 | Off | — | On | On |
| 303 | Off | — | On | On |
| 304 | On | — | On | Off |
| 305 | On | — | On | Off |
| 306 | On | On | — | Off |
| 307 | On | Off | On | — |
| 308 | On | Off | On | — |
| 309 | Off | On | On | — |

Figure 8:
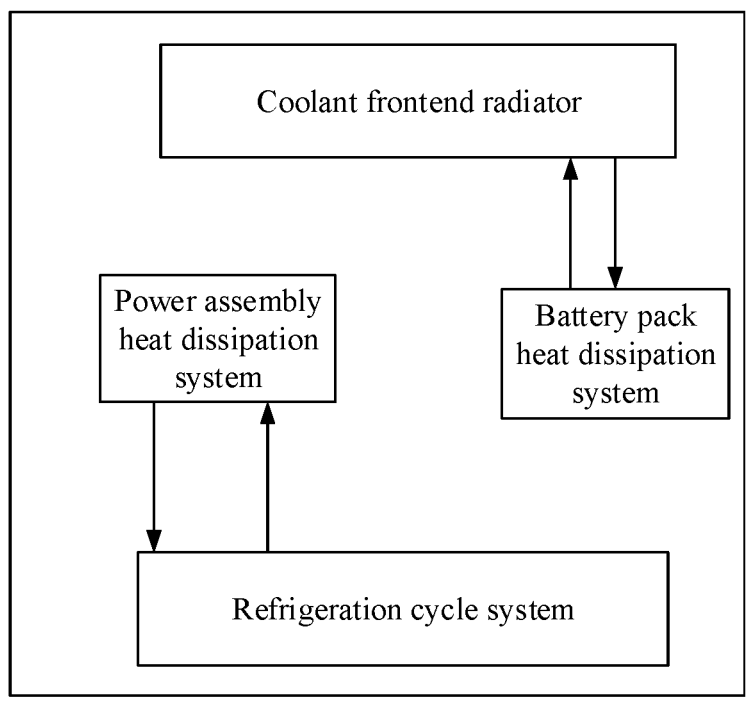
FIG. 8 is a schematic diagram of a heat dissipation topology in another working condition of a vehicle thermal management system according to an embodiment of this application.

It may be understood that "-" in the table is used to indicate that the valve does not have the valve port. It may be learned from the on/off logic of the valves shown in Table 2 that the coolant cycle frontend radiator 2011, the bypass water pump 2015, and the battery pack heat dissipation system 2013 are connected in series. The power assembly heat dissipation system 2012, the refrigeration cycle system 100, and the primary path water pump 2014 are connected in series. The battery pack heat dissipation system 2013 and a branch in which the power assembly heat dissipation system 2012 is located is connected in parallel. To be specific, a heat dissipation topology relationship between the battery pack heat dissipation system and the power assembly heat dissipation system may be shown in FIG. 8. In a cycle, a coolant at a fourth temperature passes through the coolant cycle frontend radiator to become a coolant at a fifth temperature. Then, the bypass water pump pumps the coolant at the fifth temperature to pass through the battery pack heat dissipation system to become the coolant at the fourth temperature, and in this case, the fourth temperature is greater than the fifth temperature. Then, the bypass water pump pumps the coolant at the fourth temperature to the coolant frontend radiator. Then, after the coolant passes through the coolant cycle frontend radiator, the foregoing operations continue. In addition, in a cycle, a coolant at a sixth temperature experiences refrigeration of the refrigeration cycle system to become a coolant at a seventh temperature. The primary path water pump pumps the coolant at the seventh temperature to the power assembly heat dissipation system to become the coolant at the sixth temperature. Then, the primary path water pump pumps the coolant at the sixth temperature to the refrigeration cycle system. After the coolant passes through the refrigeration cycle system, the foregoing operations continue. It may be understood that the fourth temperature, the fifth temperature, the sixth temperature, and the seventh temperature in this embodiment each indicate a temperature range. In this working condition, because a vehicle is in a working mode of high torque and high output, the natural heat dissipation cannot meet heat dissipation of the power assembly heat dissipation system on the power assembly, and the power assembly heat dissipation system switches to refrigeration heat dissipation. In addition, a current ambient temperature is appropriate, and the natural heat dissipation can meet a heat dissipation requirement of the battery pack. Therefore, the battery pack heat dissipation system uses the natural heat dissipation, which can effectively reduce refrigeration power consumption.

Figure 9:
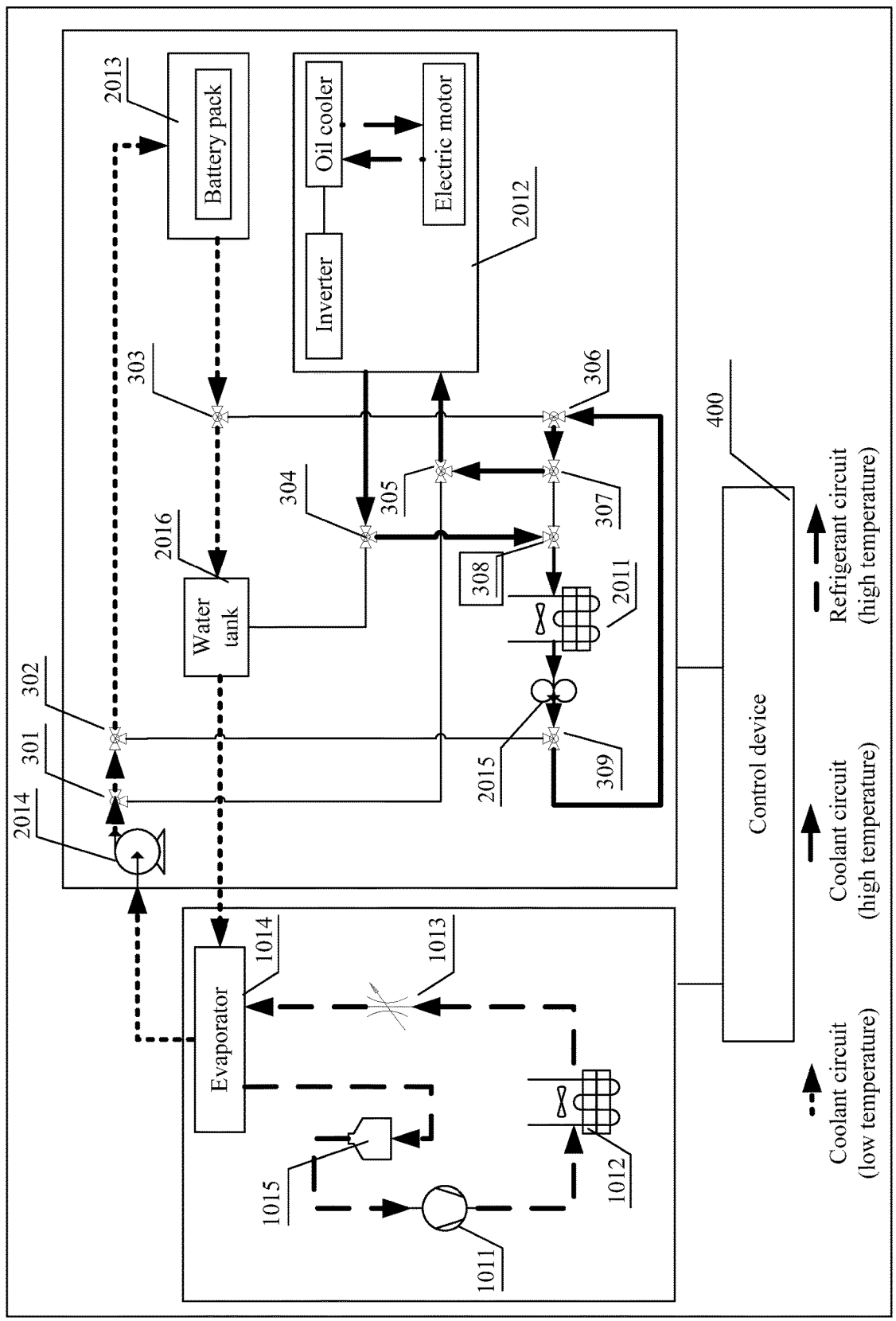
FIG. 9 is a schematic diagram of a heat dissipation circuit in another working condition of a vehicle thermal management system according to an embodiment of this application.

In a working condition, the battery pack heat dissipation system uses a refrigeration heat dissipation mode, the power assembly heat dissipation system uses a natural heat dissipation mode, and heat dissipation circuits of the battery pack heat dissipation system and the power assembly heat dissipation system are shown in FIG. 9.

The control device 400 controls the refrigeration cycle system 100 to be enabled, the primary path water pump 2014 to be turned on, and the bypass water pump 2015 to be turned on, and on/off logic of each valve bank in the valve bank system 300 is shown in Table 3.

TABLE 3

| Valve | Left valve port | Upper valve port | Right valve port | Lower valve port |
|---|---|---|---|---|
| 301 | On | — | On | Off |
| 302 | On | — | On | Off |
| 303 | On | — | On | Off |
| 304 | Off | — | On | On |
| 305 | Off | — | On | On |
| 306 | On | Off | — | On |
| 307 | Off | On | On | — |
| 308 | On | On | Off | — |
| 309 | On | Off | On | — |

Figure 10:
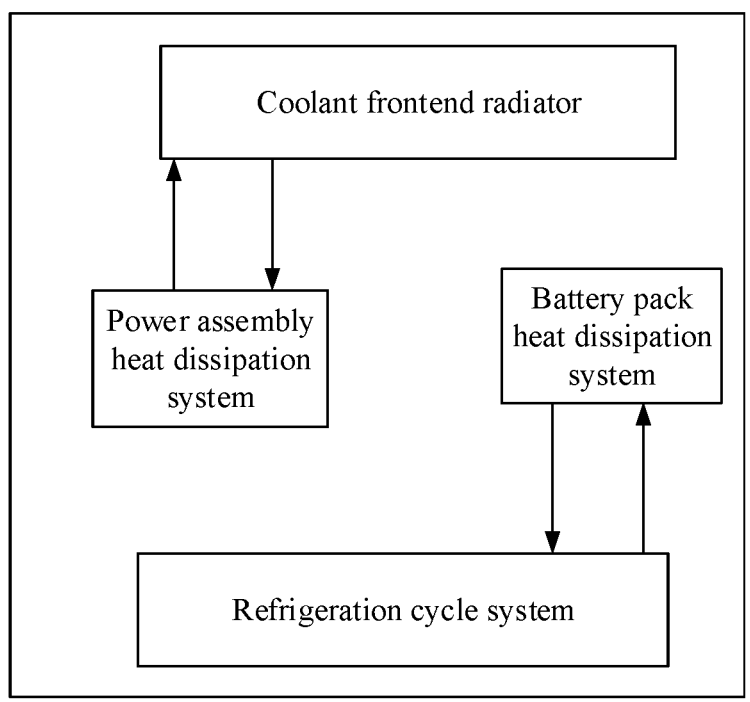
FIG. 10 is a schematic diagram of a heat dissipation topology in another working condition of a vehicle thermal management system according to an embodiment of this application.

It may be understood that "-" in the table is used to indicate that the valve does not have the valve port. It may be learned from the on/off logic of the valves shown in Table 3 that the coolant cycle frontend radiator 2011, the bypass water pump 2015, and the power assembly heat dissipation system 2012 are connected in series. The battery pack heat dissipation system 2013, the refrigeration cycle system 100, and the primary path water pump 2014 are connected in series. The battery pack heat dissipation system 2013 and a branch in which the power assembly heat dissipation system 2012 is located is connected in parallel. To be specific, a heat dissipation topology relationship between the battery pack heat dissipation system and the power assembly heat dissipation system may be shown in FIG. 10. In a cycle, a coolant at an eighth temperature passes through the coolant cycle frontend radiator to become a coolant at a ninth temperature. Then, the bypass water pump pumps the coolant at the ninth temperature to pass through the power assembly heat dissipation system to become the coolant at the eighth temperature. Then, the bypass water pump pumps the coolant at the eighth temperature to the coolant cycle frontend radiator; and the previous operation continues. In addition, in a cycle, a coolant at a tenth temperature experiences refrigeration of the refrigeration cycle system to become a coolant at an eleventh temperature, and in this case, the eleventh temperature is lower than the tenth temperature. Then, the primary path water pump pumps the coolant at the eleventh temperature to pass through the battery pack heat dissipation system to become the coolant at the tenth temperature. Then, the primary path water pump pumps the coolant at the tenth temperature to the refrigeration cycle system; and then the previous operation continues. It may be understood that the eighth temperature, the ninth temperature, the tenth temperature, and the eleventh temperature in this embodiment each indicate a temperature range. In this working condition, due to an excessive ambient temperature, the natural heat dissipation cannot meet heat dissipation of the battery pack heat dissipation system on the battery pack. Therefore, the battery pack heat dissipation system switches to refrigeration heat dissipation. In addition, the power assembly is in a normal working mode, and natural heat dissipation can meet a heat dissipation requirement of each component of the power assembly. Therefore, the power assembly heat dissipation system uses natural heat dissipation, which can effectively reduce refrigeration power consumption.

Figure 11:
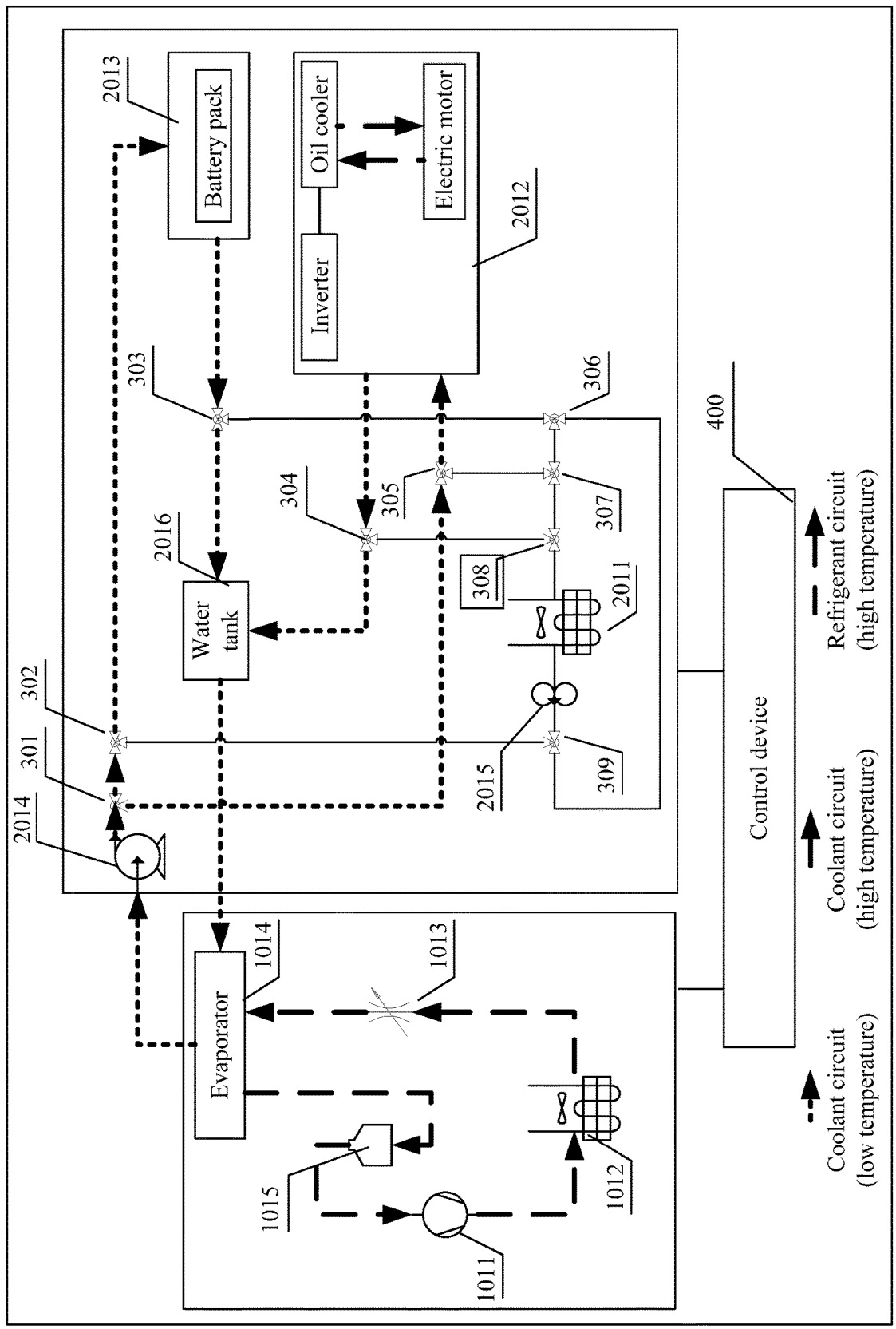
FIG. 11 is a schematic diagram of a heat dissipation circuit in another working condition of a vehicle thermal management system according to an embodiment of this application.

In a working condition, the battery pack heat dissipation system uses a refrigeration heat dissipation mode, the power assembly heat dissipation system uses a refrigeration heat dissipation mode, and heat dissipation circuits of the battery pack heat dissipation system and the power assembly heat dissipation system are shown in FIG. 11.

The control device 400 controls the refrigeration cycle system 100 to be enabled, the primary path water pump 2014 to be turned on, and the bypass water pump 2015 to be turned off, and on/off logic of each valve bank in the valve bank system 300 is shown in Table 4.

TABLE 4

| Valve | Left valve port | Upper valve port | Right valve port | Lower valve port |
|---|---|---|---|---|
| 301 | On | — | On | On |
| 302 | On | — | On | Off |
| 303 | On | — | On | Off |
| 304 | On | — | On | Off |
| 305 | On | — | On | Off |
| 306 | Random | Random | — | Random |
| 307 | Random | Random | Random | — |
| 308 | Random | Random | Random | — |
| 309 | Random | Random | Random | — |

Figure 12:
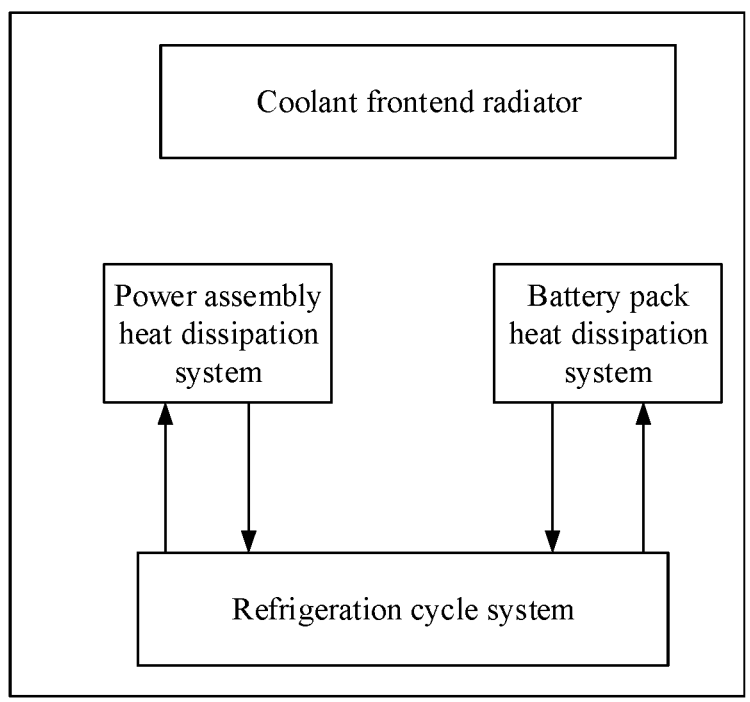
FIG. 12 is a schematic diagram of a heat dissipation topology in another working condition of a vehicle thermal management system according to an embodiment of this application.

It may be understood that "-" in the table is used to indicate that the valve does not have the valve port. It may be learned from the on/off logic of the valves shown in Table 4 that the power assembly heat dissipation system 2012, the refrigeration cycle system 100, and the primary path water pump 2014 are connected in series. The battery pack heat dissipation system 2013, the refrigeration cycle system 100, and the primary path water pump 2014 are connected in series. The battery pack heat dissipation system 2013 and a branch in which the power assembly heat dissipation system 2012 is located is connected in parallel. To be specific, a heat dissipation topology relationship between the battery pack heat dissipation system and the power assembly heat dissipation system may be shown in FIG. 12. In a cycle, a coolant experiences refrigeration of the refrigeration cycle system to become a coolant at a twelfth temperature. Then, the primary path water pump pumps the coolant at the twelfth temperature to pass through the battery pack heat dissipation system to become a coolant at a thirteenth temperature, where the thirteenth temperature is greater than the twelfth temperature. In addition, the primary path water pump pumps the coolant at the twelfth temperature to pass through the power assembly heat dissipation system to become a coolant at a fourteenth temperature, where the fourteenth temperature is greater than the twelfth temperature. Then, the primary path water pump separately pumps the coolant at the thirteenth temperature and the coolant at the fourteenth temperature to the refrigeration cycle system; and then the foregoing operations continue. It may be understood that the twelfth temperature, the thirteenth temperature, and the fourteenth temperature in this embodiment each indicate a temperature range. In this working condition, due to an excessive ambient temperature, the natural heat dissipation cannot meet heat dissipation of the battery pack heat dissipation system on the battery pack. Therefore, the battery pack heat dissipation system switches to refrigeration heat dissipation. In addition, the power assembly is in a working mode of high torque and high output, and the natural heat dissipation cannot meet a heat dissipation requirement of each component of the power assembly. Therefore, the power assembly heat dissipation system switches to refrigeration heat dissipation, which can effectively ensure that each component in the vehicle does not work at an overtemperature.

Figure 13:
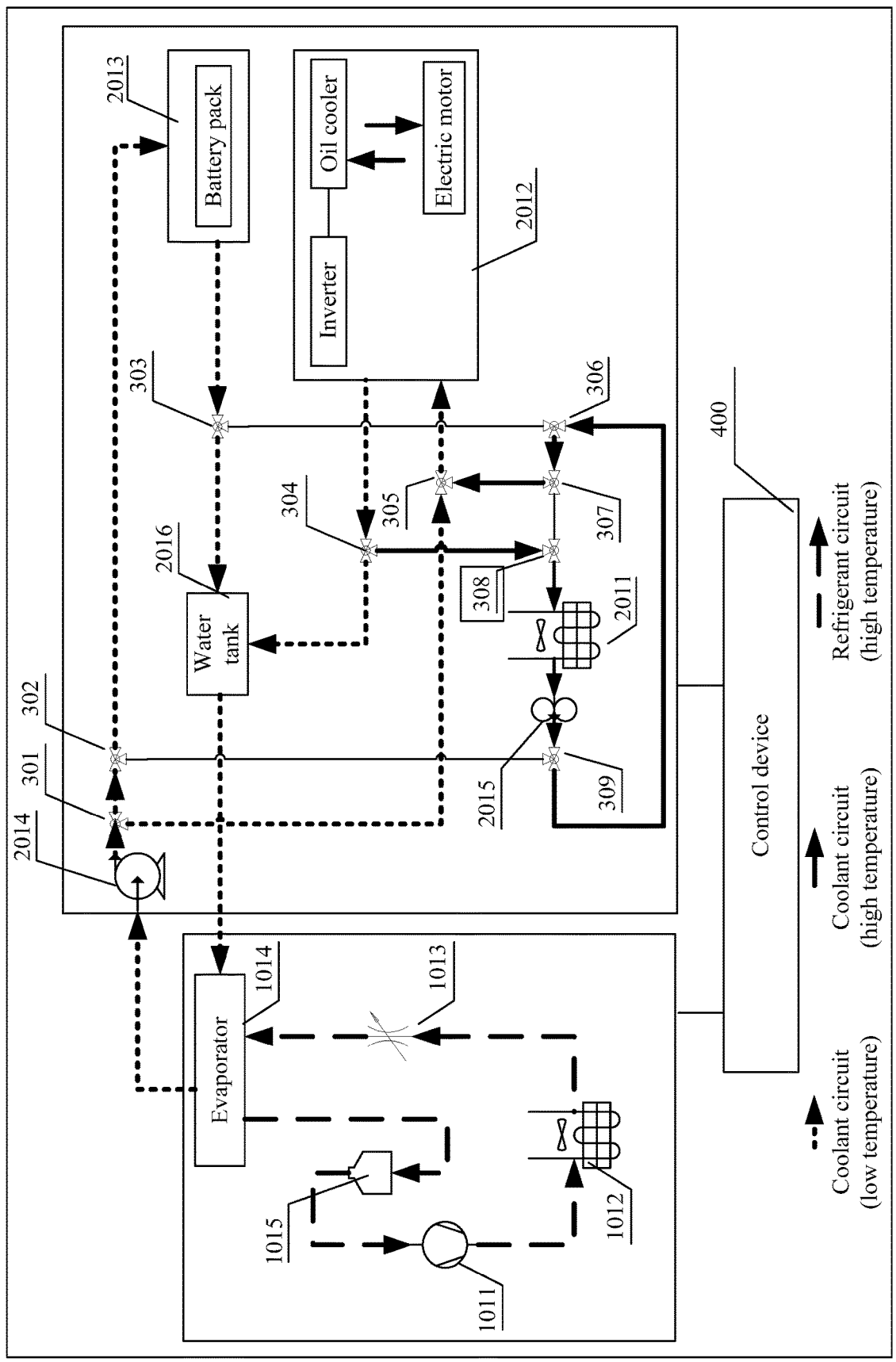
FIG. 13 is a schematic diagram of a heat dissipation circuit in another working condition of a vehicle thermal management system according to an embodiment of this application.

In the heat dissipation circuit shown in FIG. 11, the control device 400 may further control the bypass water pump 2015 to be turned on. In this case, the heat dissipation circuit of the vehicle thermal management system is shown in FIG. 13, and on/off logic of each valve of the valve bank system 300 is shown in Table 5.

TABLE 5

| Valve | Left valve port | Upper valve port | Right valve port | Lower valve port |
|---|---|---|---|---|
| 301 | On | — | On | On |
| 302 | On | — | On | Off |
| 303 | On | — | On | Off |
| 304 | On | — | On | On |
| 305 | On | — | On | On |
| 306 | On | Off | — | On |
| 307 | Off | On | On | — |
| 308 | On | On | Off | — |
| 309 | On | Off | On | — |

Figure 14:
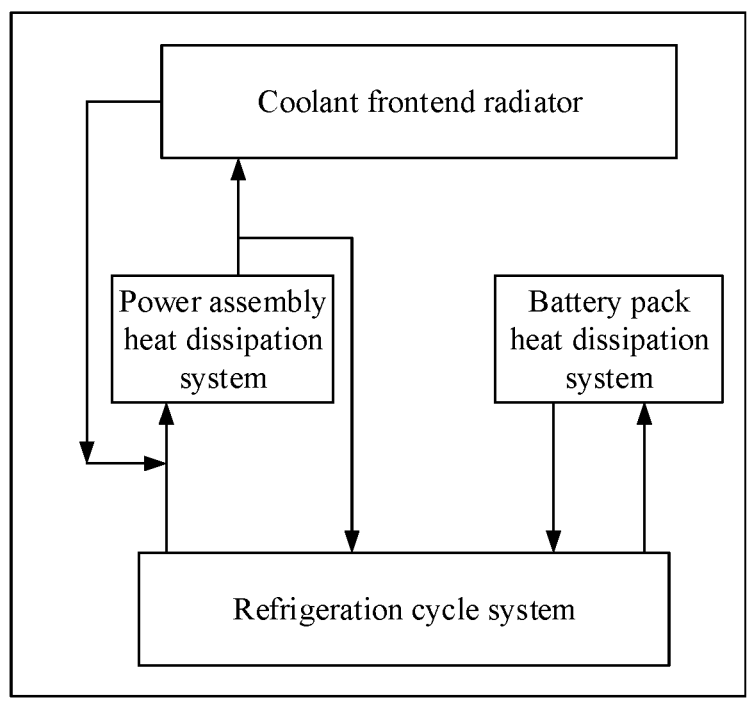
FIG. 14 is a schematic diagram of a heat dissipation topology in another working condition of a vehicle thermal management system according to an embodiment of this application.

It may be understood that "-" in the table is used to indicate that the valve does not have the valve port. In this case, the power assembly heat dissipation system 2012 is connected in series to the coolant cycle frontend radiator 2011 and the bypass water pump 2015 by using the valve bank system 300. To be specific, a heat dissipation topology relationship between the battery pack heat dissipation system and the power assembly heat dissipation system may be shown in FIG. 14. The bypass water pump 2015 pumps a first-part coolant of the coolant at the fourteenth temperature to the coolant cycle frontend radiator to become the coolant at the twelfth temperature. Then, the bypass water pump pumps the coolant at the twelfth temperature to the power assembly heat dissipation system, and repeats the foregoing operations. The primary path water pump pumps a second-part coolant of the coolant at the fourteenth temperature to the refrigeration cycle system to obtain the coolant at the twelfth temperature after refrigeration, pumps the coolant at the twelfth temperature to the power assembly heat dissipation system, and repeats the foregoing operations. A sum of a volume of the first-part coolant and a volume of the second-part coolant is equal to a volume of an entire coolant passing through the power assembly heat dissipation system. In embodiments, the first- and second-parts of the coolant are portions of the coolant, such that the portions equal an entire amount of the coolant. In this solution, when pumping the first-part coolant by using the bypass water pump, the control device further needs to control a rotational speed of the bypass water pump based on an inlet coolant temperature of the power assembly, so as to control the volume of the first-part coolant. In this working condition, the control device may control most of heat of the power assembly to be discharged into the air in a natural heat dissipation manner, thereby reducing refrigeration energy consumption of the refrigeration cycle system.

Based on the foregoing working conditions, control policies of the vehicle thermal management system for the power assembly heat dissipation system and the battery pack heat dissipation system may be shown in FIG. 15 and FIG. 16, which are described in the following.

Figure 15:
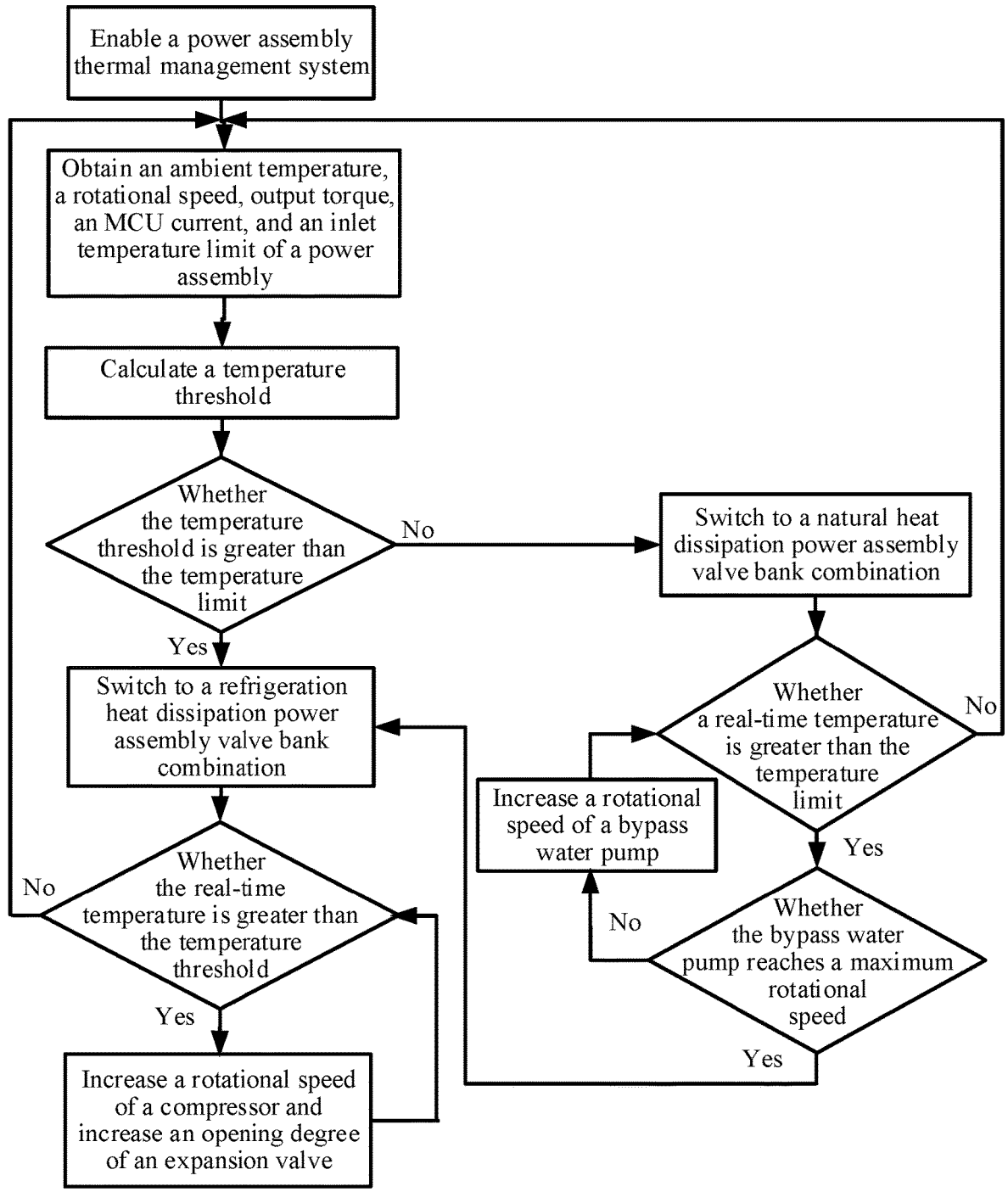
FIG. 15 is a flowchart of an embodiment of a method for implementing a control policy during heat dissipation of a power assembly according to an embodiment of this application.

FIG. 15 is an embodiment of a method for implementing a control policy for a power assembly heat dissipation system according to an embodiment of this application. The method may be implemented by one or more of the systems and/or circuits discussed herein. In embodiments, the method is as follows:

In FIG. 15, a temperature threshold is an inlet temperature that the power assembly can reach by using natural heat dissipation in a current environment and a current working mode. The temperature limit is a maximum temperature that the power assembly can tolerate; and the real-time inlet temperature is a currently detected inlet temperature of a coolant of the power assembly.

After the power assembly thermal management system (or may be the control device shown in FIG. 3 to FIG. 14) is enabled, the power assembly thermal management system obtains an ambient temperature, a working rotational speed of the power assembly (such as a rotational speed of an engine), output torque of the power assembly, an MCU current, and the temperature limit. Then, a coolant temperature threshold (that is, a temperature of the coolant at an inlet of the power assembly) that can be reached when natural heat dissipation is performed on the power assembly in a current scenario is calculated based on the foregoing data. Then, the temperature threshold is compared with the temperature limit, and if the temperature threshold is less than the temperature limit, the power assembly thermal management system controls the valve bank system to switch to a natural heat dissipation combination. If the temperature threshold is greater than the temperature limit, the power assembly thermal management system controls the valve bank to switch to a refrigeration heat dissipation combination. After the valve bank system performs switching, the following two conditions are described:

In a case of natural heat dissipation, the power assembly thermal management system obtains an inlet coolant actual temperature of the power assembly in real time, and then compares the actual temperature with the temperature limit. If the actual temperature is not greater than the temperature limit, the first step is repeated after the cycle is completed. If the actual temperature is greater than the temperature limit, whether a rotational speed of the bypass water pump reaches a maximum speed is determined; and if no, the rotational speed of the bypass water pump is increased; or if yes, the power assembly thermal management system controls the valve bank to switch to the refrigeration heat dissipation combination. That is, when natural heat dissipation cannot meet heat dissipation, the power assembly thermal management system switches to the refrigeration heat dissipation. In this way, corresponding switching is performed based on an actual situation, which helps improve heat dissipation efficiency.

In another case of refrigeration heat dissipation, the power assembly thermal management system obtains an inlet coolant actual temperature of the power assembly in real time, and then compares the actual temperature with the temperature threshold. If the actual temperature is not greater than the temperature threshold, the first step is repeated after the cycle is completed. If the actual temperature is greater than the temperature threshold, a rotational speed of a compressor is increased, and an opening degree of an expansion valve is increased. In this embodiment, to implement energy saving, the power assembly thermal management system may further perform heat dissipation on the coolant by first using the natural heat dissipation system and then switching to the refrigeration heat dissipation system when the temperature threshold is greater than the temperature limit, but the temperature threshold is greater than the real-time temperature. In this implementation, a higher rotational speed of the bypass water pump causes a larger flow rate, a stronger heat dissipation capability of the coolant frontend radiator, and a lower inlet coolant temperature (close to an ambient temperature) of the power assembly. A higher rotational speed of the compressor causes a larger cooling capacity of the refrigeration cycle system. A larger opening degree of the expansion valve causes a larger cooling capacity of the refrigeration cycle system. The rotational speed of the compressor and the opening degree of the expansion valve are controlled collaboratively in the control policy.

Figure 16:
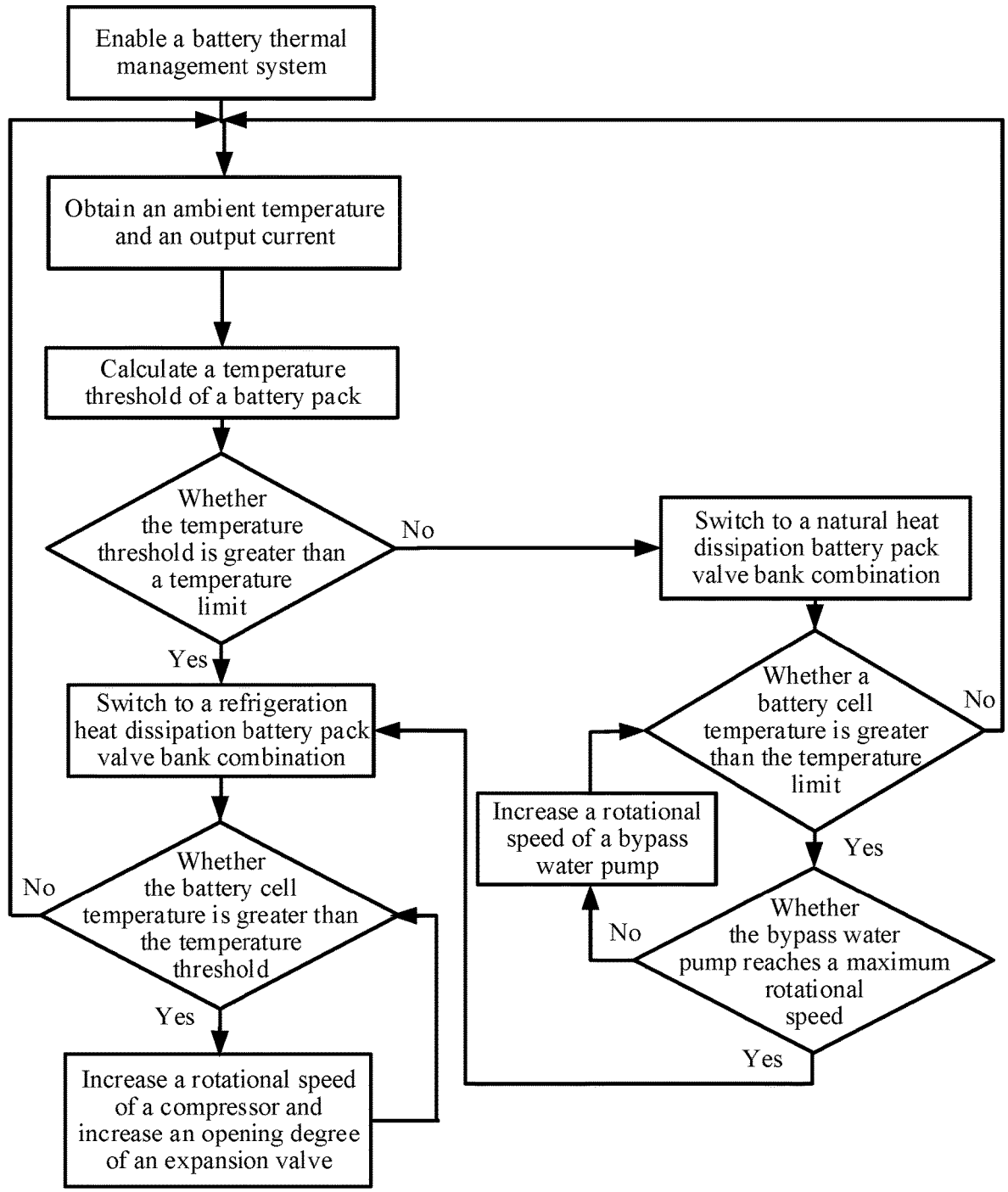
FIG. 16 is a flowchart of an embodiment of a method for implementing a control policy during heat dissipation of a battery pack according to an embodiment of this application.

FIG. 16 is an embodiment of a method for implementing a control policy for a battery pack heat dissipation system according to an embodiment of this application, which is as follows:

In FIG. 16, a temperature threshold is an inlet temperature that the battery pack can reach by using natural heat dissipation in a current environment and a current working mode. The temperature limit is a maximum temperature that can be tolerated by the battery pack; and the battery cell temperature is a currently detected temperature of a battery pack cell.

After the battery pack thermal management system (or may be the control device shown in FIG. 3 to FIG. 14) is enabled, the battery pack thermal management system obtains an ambient temperature and an output current. Then, a temperature threshold of the battery pack is calculated based on the ambient temperature and the output current. Then, the temperature threshold is compared with an inlet coolant temperature limit of the battery pack. If the temperature threshold is less than the temperature limit, the battery pack thermal management system controls the valve bank system to switch to a natural heat dissipation combination. If the temperature threshold is greater than the temperature limit, the battery pack thermal management system controls the valve bank to switch to a refrigeration heat dissipation combination. After the valve bank system performs switching, the following two conditions are described:

In a case of natural heat dissipation, the battery pack thermal management system obtains a battery cell temperature of the battery pack in real time, and then compares the battery cell temperature with the temperature limit. If the battery cell temperature is not greater than the temperature limit, the first step is repeated after the cycle is completed. If the battery cell temperature is greater than the temperature limit, whether a rotational speed of the bypass water pump reaches a maximum speed is determined; and if no, the rotational speed of the bypass water pump is increased; or if yes, the battery pack thermal management system controls the valve bank to switch to the refrigeration heat dissipation combination.

In another case of refrigeration heat dissipation, the battery pack thermal management system obtains a battery cell temperature of the battery pack in real time, and then compares the battery cell temperature with the temperature threshold. If the battery cell temperature is not greater than the temperature threshold, the first step is repeated after the cycle is completed. If the battery cell temperature is greater than the temperature threshold, a rotational speed of a compressor is increased, and an opening degree of an expansion valve is increased. In this implementation, a higher rotational speed of the bypass water pump causes a larger flow rate, a stronger heat dissipation capability of the coolant frontend radiator, and a lower inlet coolant temperature (close to an ambient temperature) of the power assembly. A higher rotational speed of the compressor causes a larger cooling capacity of the refrigeration cycle system. A larger opening degree of the expansion valve causes a larger cooling capacity of the refrigeration cycle system. The rotational speed of the compressor and the opening degree of the expansion valve are controlled collaboratively in the control policy.

An embodiment of this application provides an electric vehicle, where the electric vehicle includes a power assembly, a battery pack, and the foregoing vehicle thermal management system shown in FIG. 3 to FIG. 16, and the vehicle thermal management system is configured to perform heat dissipation on the power assembly and the battery pack.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

The invention claimed is:

1. A vehicle thermal management system, comprising:
a coolant cycle system comprising a coolant cycle frontend radiator, a power assembly heat dissipation system, a battery pack heat dissipation system, a primary path water pump, a bypass water pump, and a valve bank system;
a refrigeration cycle system connected to the primary path water pump of the coolant cycle system;
wherein the power assembly heat dissipation system and the battery pack heat dissipation system share the refrigeration cycle system and the coolant cycle frontend radiator by using the primary path water pump, the bypass water pump, and a combination of the valve bank system; and
a control device controls a heat dissipation mode of the power assembly heat dissipation system and a heat dissipation mode of the battery pack heat dissipation system based on an ambient temperature and an inlet coolant temperature of a power assembly, wherein each heat dissipation mode is natural heat dissipation or refrigeration heat dissipation, the natural heat dissipation is heat dissipation using the coolant cycle system, and the refrigeration heat dissipation is heat dissipation using the refrigeration cycle system,
wherein that the control device controls the heat dissipation mode of the power assembly heat dissipation system and the heat dissipation mode of the battery pack heat dissipation system, when the ambient temperature is lower than a first preset threshold and the inlet coolant temperature is within a second preset range, the control device controls the power assembly heat dissipation system to use the refrigeration heat dissipation, and controls the battery pack heat dissipation system to use the natural heat dissipation, and wherein
the first preset threshold is a temperature range during normal working of a battery pack, and the second preset range is a required range of the inlet coolant temperature during high-torque high-output working of the power assembly.

2. The system according to claim 1, wherein:
when the ambient temperature is lower than the first preset threshold and the inlet coolant temperature is within a first preset range, the control device controls the power assembly heat dissipation system to use the natural heat dissipation, and controls the battery pack heat dissipation system to use the natural heat dissipation;
when the ambient temperature is higher than or equal to the first preset threshold and the inlet coolant temperature is within the first preset range, the control device controls the power assembly heat dissipation system to use the natural heat dissipation, and controls the battery pack heat dissipation system to use the refrigeration heat dissipation; and when the ambient temperature is higher than or equal to the first preset threshold and the inlet coolant temperature is within the second preset range, the control device controls the power assembly heat dissipation system to use the refrigeration heat dissipation, and controls the battery pack heat dissipation system to use the refrigeration heat dissipation, wherein the first preset range is a required range of the inlet coolant temperature during normal working of the power assembly.

3. The system according to claim 2, wherein when the control device controls the power assembly heat dissipation system to use the natural heat dissipation, and controls the battery pack heat dissipation system to use the natural heat dissipation:

the control device controls the primary path water pump to be turned off, the bypass water pump to be turned on, and the valve bank system to cause the coolant cycle frontend radiator, the bypass water pump, the battery pack heat dissipation system, and the power assembly heat dissipation system to be connected in series;

a coolant at a first temperature passes through the coolant cycle frontend radiator to become a coolant at a second temperature;

the bypass water pump pumps the coolant at the second temperature to pass through the battery pack heat dissipation system to become a coolant at a third temperature;

the bypass water pump pumps the coolant at the third temperature to pass through the power assembly heat dissipation system to become the coolant at the first temperature; and the bypass water pump pumps the coolant at the first temperature to the coolant cycle frontend radiator, wherein the first temperature, the second temperature, and the third temperature are sorted in descending order of temperatures as follows: the first temperature, the third temperature, and the second temperature; and the first temperature, the second temperature, and the third temperature each indicate a temperature range.

4. The system according to claim 2, wherein when the control device controls the power assembly heat dissipation system to use the refrigeration heat dissipation, and controls the battery pack heat dissipation system to use the natural heat dissipation:

the control device controls the refrigeration cycle system to be enabled; the primary path water pump to be turned on; the bypass water pump to be turned on; the valve bank system to cause the coolant cycle frontend radiator, the bypass water pump, and the battery pack heat dissipation system to be connected in series; and the valve bank system to cause the power assembly heat dissipation system, the refrigeration cycle system, and the primary path water pump to be connected in series, and the battery pack heat dissipation system and a branch in which the power assembly heat dissipation system is located to be connected in parallel;

a coolant at a fourth temperature passes through the coolant cycle frontend radiator to become a coolant at a fifth temperature;

the bypass water pump pumps the coolant at the fifth temperature to pass through the battery pack heat dissipation system to become the coolant at the fourth temperature;

a coolant at a sixth temperature experiences refrigeration of the refrigeration cycle system to become a coolant at a seventh temperature; and the primary path water pump pumps the coolant at the seventh temperature to pass through the power assembly heat dissipation system to become the coolant at the sixth temperature, wherein the fourth temperature is greater than the fifth temperature, and the sixth temperature is greater than the seventh temperature; and the fourth temperature, the fifth temperature, the sixth temperature, and the seventh temperature each indicate a temperature range.

5. The system according to claim 2, wherein when the control device controls the power assembly heat dissipation system to use the natural heat dissipation, and controls the battery pack heat dissipation system to use the refrigeration heat dissipation:

the control device controls the refrigeration cycle system to be enabled; the primary path water pump to be turned on; the bypass water pump to be turned on; the valve bank system to cause the coolant cycle frontend radiator, the bypass water pump, and the power assembly heat dissipation system to be connected in series; and the valve bank system to cause the battery pack heat dissipation system, the refrigeration cycle system, and the primary path water pump to be connected in series, and the battery pack heat dissipation system and a branch in which the power assembly heat dissipation system is located to be connected in parallel;

a coolant at an eighth temperature passes through the coolant cycle frontend radiator to become a coolant at a ninth temperature;

the bypass water pump pumps the coolant at the ninth temperature to pass through the power assembly heat dissipation system to become the coolant at the eighth temperature;

a coolant at a tenth temperature experiences refrigeration of the refrigeration cycle system to become a coolant at an eleventh temperature; and the primary path water pump pumps the coolant at the eleventh temperature to pass through the battery pack heat dissipation system to become the coolant at the tenth temperature, wherein the eighth temperature is greater than the ninth temperature, and the tenth temperature is greater than the eleventh temperature; and the eighth temperature, the ninth temperature, the tenth temperature, and the eleventh temperature each indicate a temperature range.

6. The system according to claim 2, wherein when the control device controls the power assembly heat dissipation system to use the refrigeration heat dissipation, and controls the battery pack heat dissipation system to use the refrigeration heat dissipation:

the control device controls the refrigeration cycle system to be enabled; the primary path water pump to be turned on; the bypass water pump to be turned off; the valve bank system to cause the power assembly heat dissipation system, the refrigeration cycle system, and the primary path water pump to be connected in series; and the valve bank system to cause the battery pack heat dissipation system, the refrigeration cycle system, and the primary path water pump to be connected in series, and the battery pack heat dissipation system and a branch in which the power assembly heat dissipation system is located to be connected in parallel;

a coolant experiences refrigeration of the refrigeration cycle system to become a coolant at a twelfth temperature;

the primary path water pump pumps the coolant at the twelfth temperature to pass through the battery pack heat dissipation system to become a coolant at a thirteenth temperature;

the primary path water pump pumps the coolant at the twelfth temperature to pass through the power assembly heat dissipation system to become a coolant at a fourteenth temperature; and the primary path water pump pumps the coolant at the thirteenth temperature and the coolant at the fourteenth temperature to the refrigeration cycle system, wherein the thirteenth temperature is greater than the twelfth temperature, and the fourteenth temperature is greater than the twelfth temperature; and the twelfth temperature, the thirteenth temperature, and the fourteenth temperature each indicate a temperature range.

7. The system according to claim 6, wherein the control device further controls the bypass water pump to be turned on causing the power assembly heat dissipation system to be connected in series to the coolant cycle frontend radiator and the bypass water pump by using the valve bank system;

the bypass water pump pumps a first portion of the coolant at the fourteenth temperature to the coolant cycle frontend radiator to become the coolant at the twelfth temperature; and the primary path water pump pumps a second portion of the coolant at the fourteenth temperature to the refrigeration cycle system, wherein a sum of the first portion of the coolant and the second portion of the coolant is equal to an entire amount of coolant passing through the power assembly heat dissipation system.

8. The system according to claim 7, wherein the control device obtains the inlet coolant temperature of the power assembly; and the control device controls a rotational speed of the bypass water pump based on the inlet coolant temperature, wherein the rotational speed of the bypass water pump determines a volume of the first portion of the coolant.

9. The system according to claim 1, wherein the refrigeration cycle system comprises a compressor, a condenser, an electronic expansion valve, a liquid cooling evaporator, and a receiver drier; and the coolant cycle system further comprises a water tank.

* * * * *